United States Patent [19]
Kamiya et al.

[11] Patent Number: 5,720,657
[45] Date of Patent: Feb. 24, 1998

[54] AIR PASSAGE SWITCHING DEVICE AND AIR CONDITIONING APPARATUS USING THE SAME

[75] Inventors: Tomohiro Kamiya, Takahama; Kazuma Inagaki, Hekinan, both of Japan

[73] Assignee: Denso Corporation, Kariya, Japan

[21] Appl. No.: 718,190

[22] Filed: Sep. 19, 1996

[30] Foreign Application Priority Data

Nov. 10, 1995 [JP] Japan ................................ 7-293089
Jun. 28, 1996 [JP] Japan ................................ 8-170165

[51] Int. Cl.$^6$ ............................................ B60H 1/00
[52] U.S. Cl. ............................ 454/121; 454/126
[58] Field of Search ........................ 454/121, 126, 454/139, 159, 160, 161

[56] References Cited

U.S. PATENT DOCUMENTS 5,062,352  11/1991  Ostrand .
5,105,730   4/1992  Smith ................................ 454/161
5,326,315   7/1994  Inoue et al. ...................... 454/126

FOREIGN PATENT DOCUMENTS 681 934   11/1995  European Pat. Off. .
27 04 522  8/1978  Germany .
1-186415   7/1989  Japan .............................. 454/121

*Primary Examiner*—Harold Joyce
*Attorney, Agent, or Firm*—Cushman, Darby & Cushman IP Group of Pillsbury Madison & Sutro LLP

[57] ABSTRACT

In switching of opening and closing air passage opening portions of an automotive air conditioning apparatus, a circumference one end of the film member is secured to one end in a circumferential direction of the rotary door by a pin member, and the other end in a circumferential direction of the film member is set to be a free end which is movable with reference to a slide wall portion of the rotary door. The variation in dimension of the film member or the case side is absorbed by movement of the free end.

12 Claims, 17 Drawing Sheets

FACE MODE

AIR PASSAGE SWITCHING DEVICE AND AIR CONDITIONING APPARATUS USING THE SAME

BACKGROUND OF THE INVENTION

1. Field of the Invention

The present invention relates to an air passage switching device and an automotive air conditioning apparatus using the same, and particularly to an apparatus for switching air passages at a film type rotary door portion.

2. Description of Related Art

The present applicant has previously proposed an air passage switching device for switching plural air passage opening portions by a film type rotary door portion of Japanese Patent Application No. hei. 6-299421. In the apparatus disclosed in this application, a rotary door having a circular outer peripheral surface is rotatably provided so as to oppose plural air passage opening portions within a case, a film member is disposed in the outer peripheral portion of the rotary door, and a door vent hole for applying air pressure to the film member is opened to the outer peripheral portion of the rotary door. The film member is provided with a film opening capable of being communicated with the air passage opening portions.

The rotary door is rotated to select its rotational position so that the plurality of air passage opening portions are selectively opened or closed. That is, the portion out of the film members, having no film opening portion, is brought into pressure contact with the peripheral edge of the air passage opening portion on the side of the case by the air pressure whereby the air passage opening portion is closed by the film member whereas the opening portion of the film member overlaps with the air passage opening portion so that both the opening portions are communicated with each other so as to open the air passages.

However, in the aforementioned apparatus, as a result of a trial production and an examination by the inventors, there has been found the following inconveniences.

That is, in the aforementioned apparatus, since both ends in the circumferential direction of the film member remain secured to both end portions in the circumferential direction of the rotary door, it is not possible to cope with the variation in dimension of the film member or the case. Therefore, in the case where the circumferential length of the film member is shorter than that of the case, even if the film member receives air pressure, it cannot be moved so as to be in pressure contact with the case, and the defective seal may be caused.

Conversely, in the case where the circumferential length of the film member is longer than that of the case, the film member may be slacked and wrinkled, and the noise is generated when the rotary door is rotated or the defective seal is caused.

SUMMARY OF THE INVENTION

In view of the foregoing, it is an object of the present invention to provide an air passage switching device using a film type rotary door in which even if unevenness in dimension of the film member or the like occurs, such an influence can be well absorbed.

To achieve the above object, an air passage switching device according to the present invention features:

a rotary door is rotated so as to selectively communicate or interrupt between a film opening portion and an air passage opening portion, and at least one end of both ends in a peripheral direction of the film member is a free end movable in a peripheral direction against the rotary door.

With this, even if a variation in dimension of the film member or the air passage opening portion, the free end of the film member can be moved in a direction of offsetting the unevenness in dimension. Therefore, for example, even in the case where the circumferential length of the film member is shorter than the design dimension, the film member can be moved in the direction so as to be placed in pressure contact with the peripheral edge of the air passage opening portions by air pressure, thereby avoiding the defective seal.

In the case where the circumferential length of the film member is longer than the design dimension, the free end of the film member moves outward in the circumferential direction of the rotary door, thereby preventing the film member from being wrinkled as well as the occurrence of noise and inconvenience of defective seal due to the wrinkle.

Plural air passage opening portions may be opened in the peripheral direction of the rotary door in the case, and the free end of the film member may be always provided at an end portion on a side positioned outside the opening range of the plural air passage opening portions.

In this way, the free end portion of the film member is never caught with a partitioning wall of the air passage opening portion of the case, and therefore, no trouble occurs in the rotational operation of the rotary door.

Further, a slide hole having an elongated shape against the peripheral direction may be provided on the free end in the peripheral direction of the film member, the rotary door may be provided with a pin member for movably fitting in the slide hole, the film member may be provided with a stopping hole in communication with a longitudinal end of the slide hole, and the pin member may be fittingly stopped in the stop hole to reduce a circular diameter of the film member, under which condition, the free end is stopped by the rotary door.

In this way, when the film member is assembled in the rotary door, the free end can be temporarily stopped by the rotary door in the state where the circular diameter of the film member is reduced.

As a result, when assembling the rotary door into the case, it is possible to prevent the film member from being caught with the protrusion of the inner wall of the case, it is possible to simplify the assembling work of the rotary door and to prevent the film member from being damaged.

Further, a stopper piece may be provided at a position in contact with the free end by rotation of the rotary door within the case, and the film member may move to shift from the stopping state between the pin member and the stop hole to the movable fitting state between the pin member and the slide hole by a contact between the stopper piece and the free end. Thus, the free end can be set to a normal movable state by a simple operation, i.e., rotational operation of the rotary door.

The other end in the peripheral direction of the film member may be a free end movable in a radial direction of the film member against the rotary door.

In this way, the free end on the other end side of the film member can be moved radially according to the frictional force between the outer peripheral surface of the film member and the inner wall surface of the case, and the outer peripheral surface of the film member can be maintained to be circular shape along the circular shape of the inner wall surface of the case. Therefore, even if the rotational direction of the rotary door varies, the variation in operating force of the rotary door can be reduced.

Further, at least one end in the peripheral direction of the film member may be provided with a spring mechanism portion formed of a bent shape of the film member, and an impact force for pressing the film member against the peripheral portion of the air passage opening portions is generated by the spring mechanism portion.

In this way, even if a variation in dimension occurs in the film member or the air passage opening portion, the spring mechanism portion is deformed in the direction of offsetting the variation in dimension to absorb the variation in dimension, thus preventing the occurrence of the defective seal and noise due to the variation in dimension.

In addition, since the impact force for pressing the film member against the peripheral edge of the air passage opening portion is generated by the spring mechanism portion. Therefore, the film member is further certainly pressed against the peripheral edge of the air passage opening portion by always applying the impact force by the spring mechanism portion in addition to the air pressure. Therefore, even in the state where the air amount in the case lowers and air pressure lowers, the film portion is pressed with the impact force by the spring mechanism portion to improve the seal performance.

Further, the spring mechanism portion of the film member may be provided always at an end portion on a side positioned outside the opening range of the plural air passage opening portions. Therefore, the rotary door can not be impaired in the rotational operation by the spring mechanism portion.

Further, the film member may have a rigidity of the flexible value being equal to 240 g or more according to a loop compression method of JIS (Japanese Industrial Standards): L1096. Since the rigidity of the film member is set relatively high, it is possible to prevent the film member from partially entering the plural air passage opening portions, thereby favorably maintaining the opening and closing operation of the film member.

DETAILED DESCRIPTION OF THE EMBODIMENTS

Embodiments of the present invention will be described hereinafter with reference to the drawings.

Figure 1:
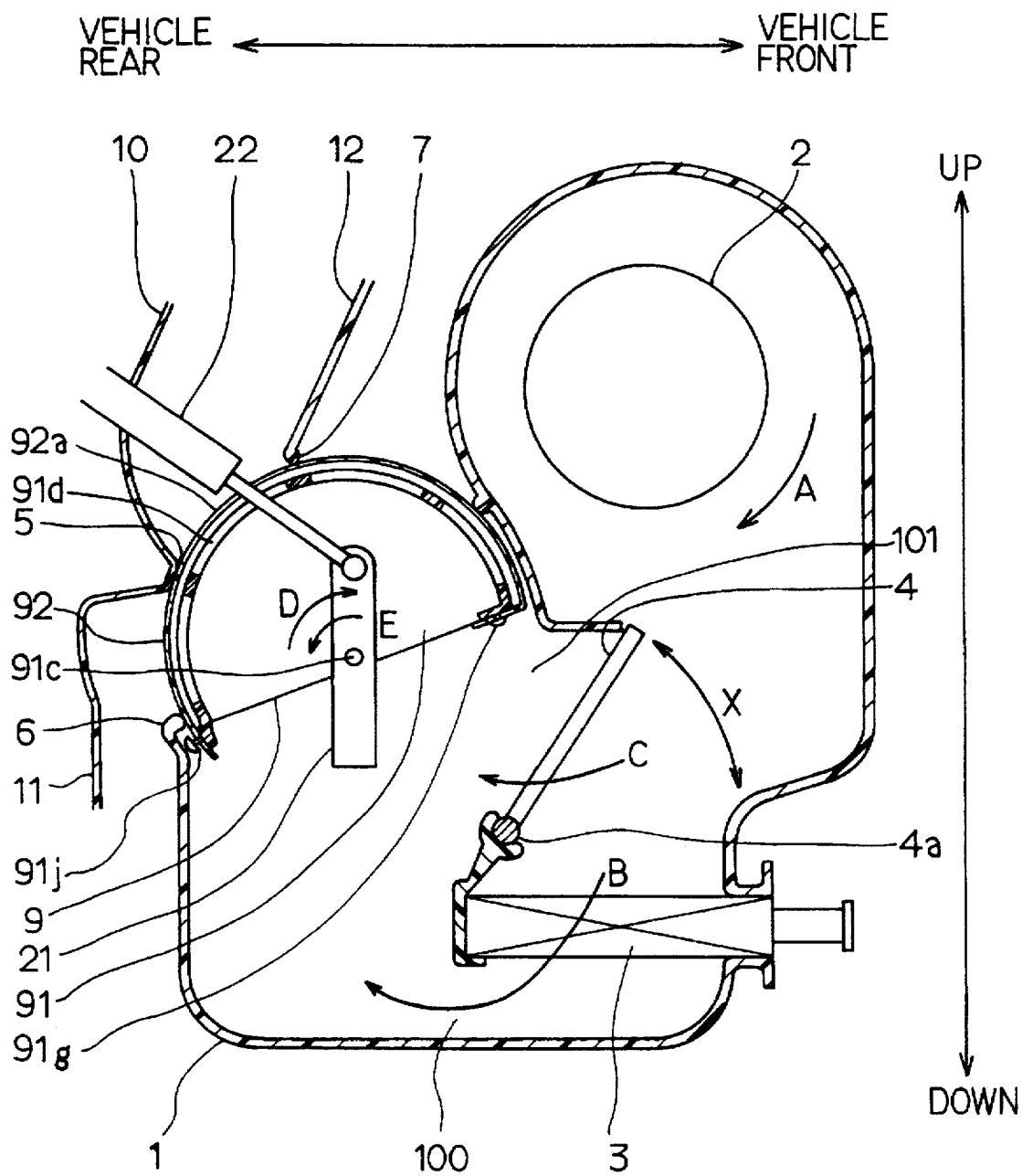
FIG. 1 is a schematic cross sectional view of a main portion of an automotive air conditioning apparatus according to a first embodiment of the present invention.

FIG. 1 shows an entire ventilation system in an embodiment in which the present invention is applied to an air conditioning apparatus for a vehicle (automotive air conditioner). A case 10 constitutes an air passage of the automotive air conditioner, the case 1 being normally installed within a dashboard (not shown) in front portion within a passenger compartment. Within the case 1 is disposed a blower 2 as air blowing means at a right upper portion (at an upper portion of the front side of the vehicle) in FIG. 1.

The blower 2 includes a known multi-blade fan driven by a motor, which sucks air into the case 1 through a duct on the suction side (not shown) connected to the case, and blows air in a direction of arrow A.

An evaporator as cooling means for cooling air is disposed on the duct on the suction side, an inside air inlet and an outside air inlet are provided on an upstream air side of the evaporator, and an inside/outside air switching door for opening either one of inlets is provided. The evaporator is provided in a refrigeration cycle including a compressor driven by an engine of the vehicle. Air is cooled by evaporation latent heat of a refrigerant.

As shown in FIG. 1, a heater core 3 as heating means is disposed substantially horizontally at the right lower portion (lower portion of the front side of the vehicle) in FIG. 1 within the case 1. In the heater core 3, engine cooling water (hot water) of the vehicle circulates by way of a pump (not shown). Air is heated with the engine cooling water as a heating source.

An air mixing door 4 is provided on an upstream air side of the heater core 3. The air mixing door 4 is rotated with its rotary shaft 4a as a center in a direction of arrow X to control a temperature of air blown out into the passenger compartment and constitutes temperature control means. The air mixing door 4 is adjusted in its opening degree according to the air conditioning conditions by a manual operation of the passenger or by an automatic temperature control signal of an air conditioning control apparatus.

According to the opening degree of the air mixing door 4, a ratio, out of air blown in the direction of arrow A by the blower 2, between an amount of hot air flowing through a hot air passage 100 in a direction of arrow B passing through the heater core 3 and an amount of cool air flowing through a cool air passage 101 in a direction of arrow C not passing through the heater core is adjusted. In this embodiment, the cool air passage 101 and the hot air passage 100 are arranged vertically in FIG. 1 with the heater core 3 located therebetween. In most cases, the cool air and hot air flowing through the passages 100 and 101 are favorably mixed within a circular rotary door 91 described later.

On the other hand, in the case 1, a plurality (three in this embodiment) of air passage opening portions 5, 6 and 7 arranged adjacent to each other in the rotating direction (circumferential direction) of the rotary door 91 within the area in which the rotary door 91 described later is rotated at the left upper portion (upper portion of the rear side of the vehicle) in FIG. 1. Accordingly, a top end of a partitioning wall constituting the air passage opening portions 5, 6 and 7 on the side of the case 1 is formed to be a circular surface.

The air passage opening portion 5 located at an intermediate position in the rotational direction of the rotary door 91 is disposed on an upper side of the dashboard within the passenger compartment and is communicated by a face air outlet (not shown) for blowing out air toward the upper half of the body of a passenger and a face air duct 10.

The air passage opening portion 6 located at the rearmost position of the vehicle in the rotational direction of the rotary door 91 is disposed on a lower side of the dashboard within the passenger compartment and is communicated by a face air outlet (not shown) for blowing out air toward the upper half of the body of a passenger and a foot air duct 11.

The air passage opening portion 7 located at the foremost position of the vehicle in the rotational direction of the rotary door 91 is disposed in the upper surface of the dashboard within the passenger compartment and adjacent to the windshield surface of the vehicle and is communicated by a defroster air outlet (not shown) for blowing out conditioned air toward inner surfaces of the front windshield and side windshields of the vehicle and a defroster duct 12.

In this embodiment, the face duct 10 and the defroster duct 12 commonly use each intermediate portion of the ventilation wall of both the ducts to downsize the automotive air conditioning apparatus itself and to contribute to make opening areas of both the air passage opening portions 5 and 7 as large as possible.

Each of the three air passage opening portions 5, 6 and 7 is formed in the shape of a substantially rectangular shape, a longitudinal direction of which is of a direction from the front surface to the back surface of the sheet in FIG. 1.

When the blower 2 is driven, inside air or outside air is sucked from the duct on the suction side and introduced into the case 1 passing through the evaporator. Air flows into the case 1 as indicated by arrows A, B and C, and the ratio between cool air and warm air is adjusted by the opening degree of the air mixing door 4 to obtain the desired air temperature. The air is blown out from each air outlet within the vehicle through the air passage opening portions 5, 6 and 7. In this embodiment, five blow modes described later can be selected by the three air passage opening portions 5, 6 and 7.

Within the case 1 is provided an air passage switching device 9 for opening or closing the three air passage opening portions 5, 6 and 7 and for adjusting each opening area thereof. The air passage switching device 9 according to this embodiment will be described hereinafter in detail with reference to FIGS. 2 to 5.

The air passage switching device 9 includes a rotary door 91 constituting a rotary door portion of the present invention and a film member 92

Figure 2A:
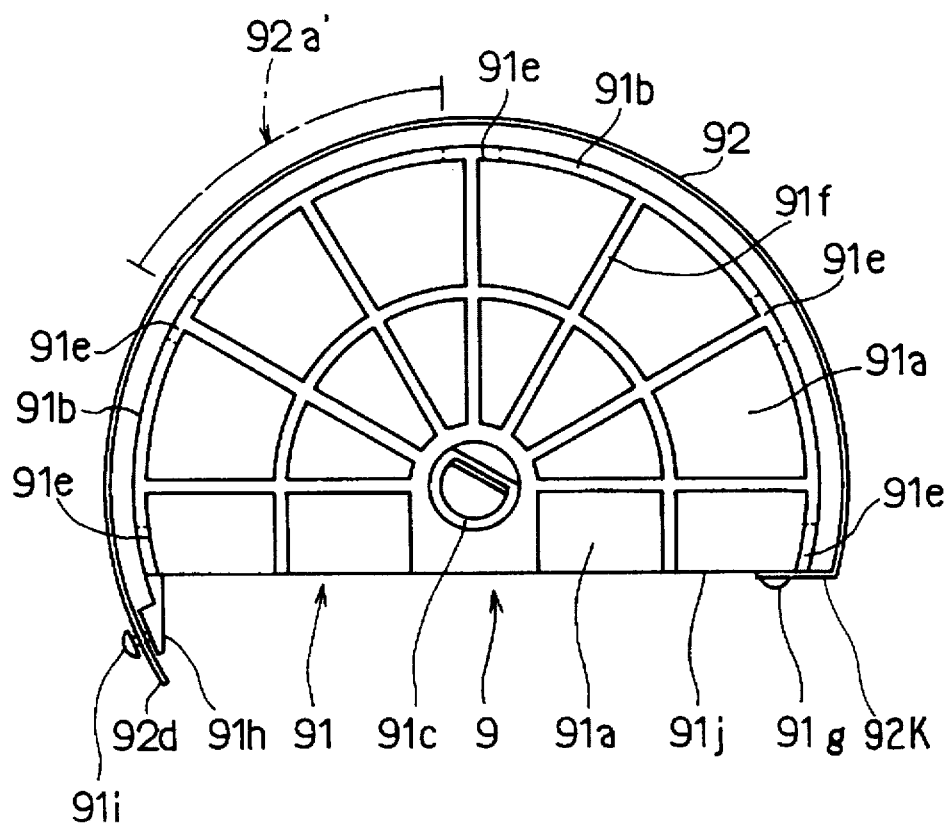
FIG. 2A is a side view of a rotary door portion shown in FIG. 1.
Figure 2B:
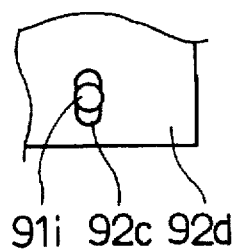
FIG. 2B is a front view of the main portion.
Figure 3:
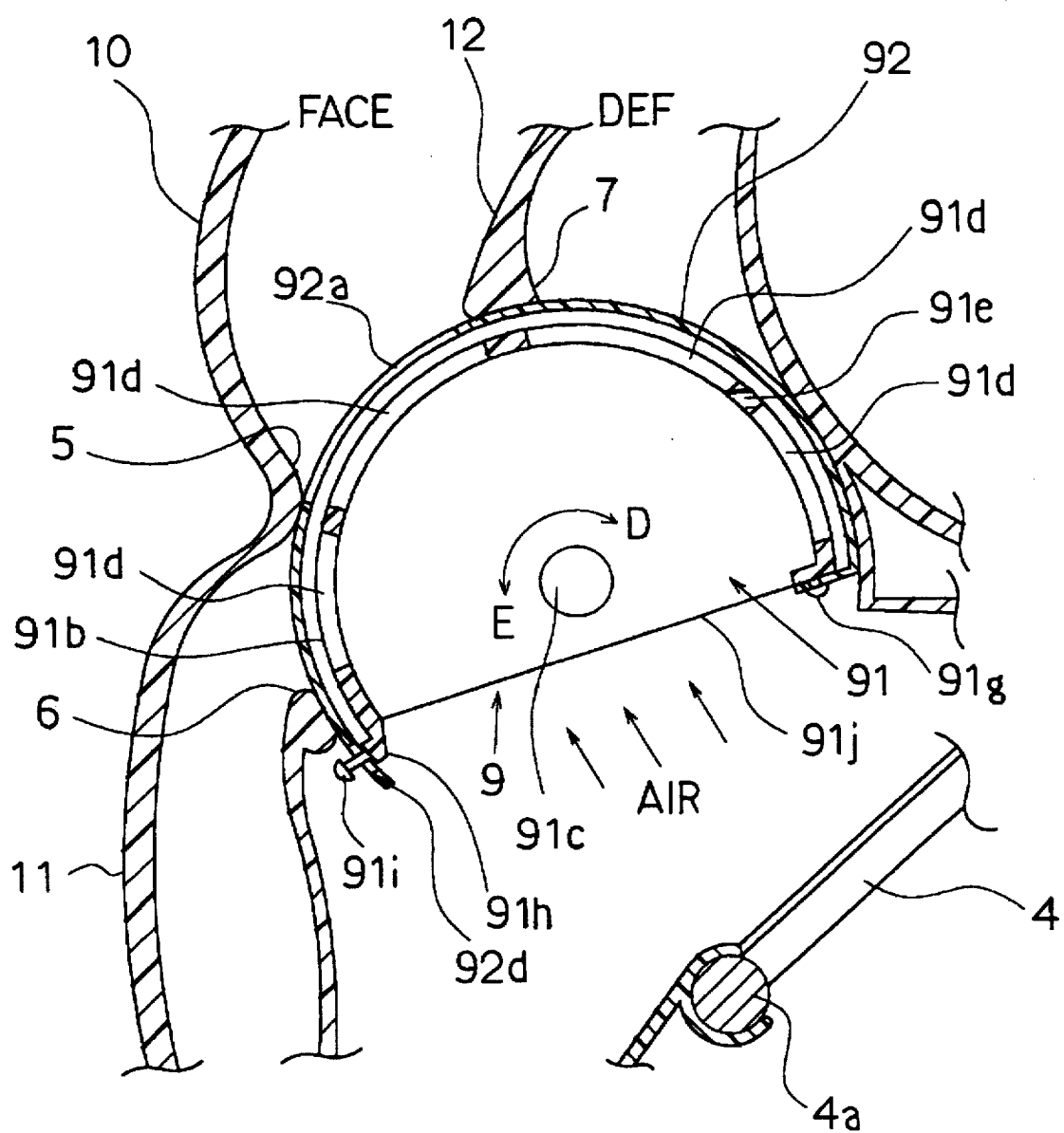
FIG. 3 is an enlarged cross sectional view of the main portion shown in FIG. 1.
Figure 4:
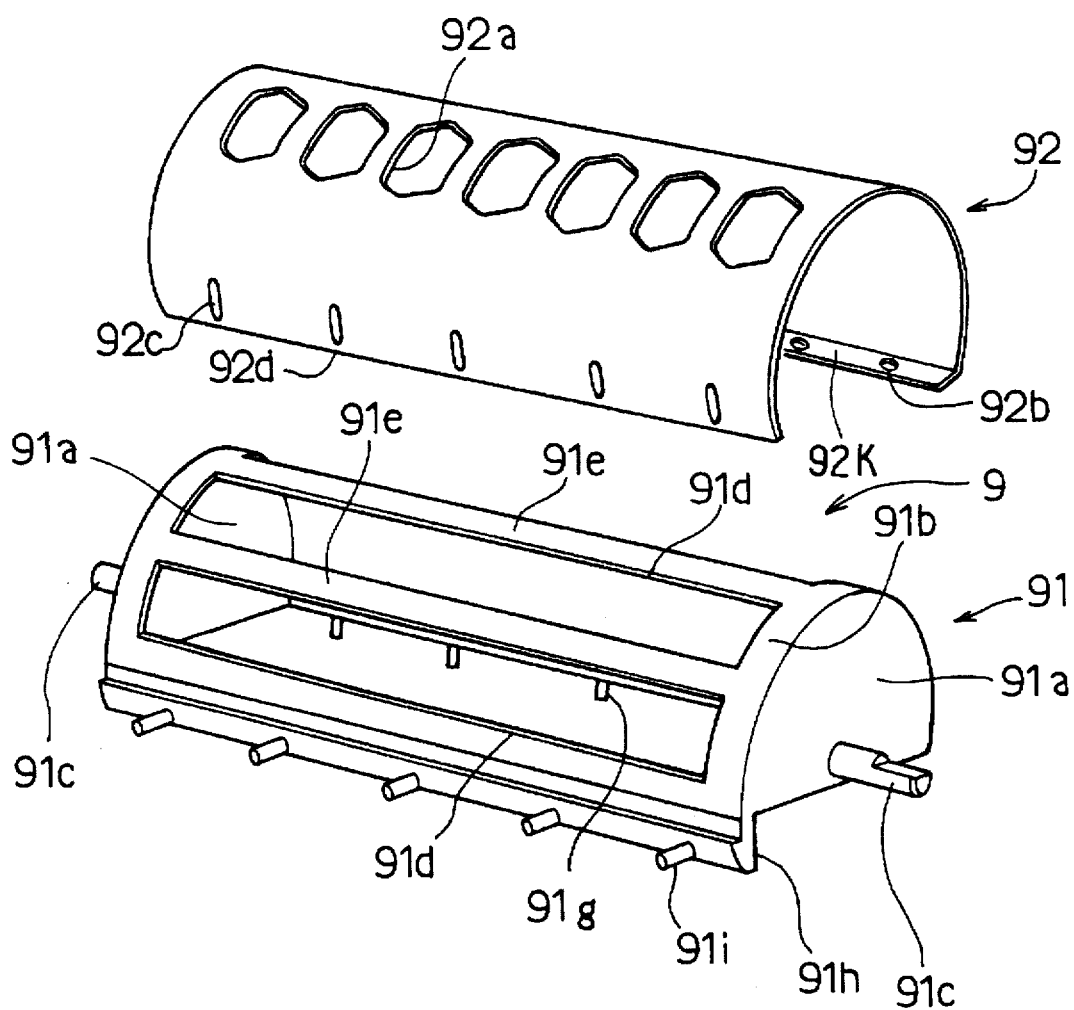
FIG. 4 is an exploded perspective view of the rotary door portion.

The rotary door 91 is formed of, for example, resin, and is so-called longitudinally separated half cylinder integrally provided with two semicircular end plates 91a, 91a, as shown in FIGS. 2 to 4. A circular circumferential wall 91b having a circular range of approximately 180°. The end plates 91a, 91a are provided with axially outwardly projecting rotary shafts 91c, 91c located at the curvature of the circle of the circumferential wall 91b.

In the circumferential wall 91b, four axially elongated door vent openings 91d are arranged circumferentially and formed at approximately equal intervals as shown in FIG. 4 and the like. The circumferential wall 91b has axially extending elongated beams 91e, two at both end in the circumferential direction and three between the door vent openings 91d, most of the remaining portions being opened. The semicircular end plates 91a, 91a are projectingly formed with reinforcing ribs 91f as shown in FIG. 2.

In the rotary door 91, pin members (mounting means) 91g for mounting one end (end on the right side in the figure) in the circumferential direction of the circumferential wall 91b. Each pin member 91g is columnar, plural pin member 91g project downward from the lower end of the rotary door 91 as shown in FIG. 4, and plural pin members 91 are axially arranged in a row and integrally formed on the rotary door 91.

A slide wall portion 91b is provided at the other end (end on the left side in the figure) in the circumferential direction of the circumferential wall 91b of the rotary door 91. As shown in FIG. 4, the slide wall 91h projects downward from the lower end of the rotary door 91, the outer circumferential surface of the slide wall 91h forms a circular surface along the circular shape formed by the film member 92, and plural pin members 91i are axially arranged in a row and integrally molded so as to project outward from the outer circumferential surface of the slide wall portion 91h.

On the other hand, the film member 92 is formed of resin material having a flexibility, no permeability and small frictional resistance. More specifically, in this embodiment, the film member 92 is formed of PET (polyethyleneterephtalate). Since it is necessary to enhance the rigidity of the film member for the reasons described later, a PET film having 188 μm of thickness is used in this embodiment. The flexible value representative of the rigidity of the PET film having a thickness of 188 μm is preferably in the range of 240 g to 1930 g in terms of the measured value according to the loop compression method of JIS (Japanese Industrial Standards): L1096. Incidentally, the flexible value according to the loop compression method is the load necessary for pressing and deforming a loop shape portion of the film member 92 bent into a loop in a predetermined amount. The larger the flexible value is, the higher rigidity it indicates.

The film member 92 is formed into a rectangle as a whole having a width dimension M substantially equal to an axial dimension of the circumferential wall 91b of the rotary door 91. A film opening portion 92a being always in communication with a door vent opening 91d is formed at a middle portion in the direction the length L of the film member 92. In FIG. 2A, numeral 92a' shows the open range in the circumferential direction of the film opening portion 92a.

In this embodiment, the film opening portion 92a is formed from plural through-holes axially arranged in a row, each film opening portion 92a being formed into an elongated substantially hexagon, and the hexagonal longitudinal direction is directed along the direction of the length L. In the film opening portion 92a, the maximum length in the rotational direction of the rotary door 91 is substantially equal to each of the largest widths of the air passage opening portions 5 and 6 for face and foot.

The whole shape and area of all of the film opening portions 92a are substantially equal to the air passage opening portions 5 and 6. Actually, however, since the partitioning portion in which the film opening portions 92a are mutually located exists, the film opening portions 92 are slightly smaller.

In the case where the rotary door 91 opens only the air passage opening portion 5 for face (in the face mode) as shown in FIGS. 1 and 3, since open edges of the air passage opening portion 5 for face and the film opening portion 92a of the film member 92 coincide (overlap with each other), it is possible to minimize the air flow resistance in the face mode. The case where the air passage opening portion 6 for foot is fully opened is the same as the above.

On the other hand, plural mounting holes 92b are formed at the end on the right side out of both ends (left and right edges in FIG. 5) of the film member 92. The mounting hole 92b is, more specifically, formed of a circular hole fitted in the pin member 91g. Plural slide holes 92c are formed at the end on the right side. The slide hole 92c is formed of a slot in which the pin member 91i of the slide wall portion 91h is movably fitted. Since in the slide hole 92c, the slot is longitudinally directed along the direction of the length L, in the state where the film member 92 is mounted circularly on the rotary door 91, the of the slot is longitudinally directed in the circumferential direction of the circular shape. The longitudinal dimension of the slot forming the slide hole 92c is set to the size enough to absorb the dimensional variation of the film member 92 and the case 1.

In mounting the film member 92 circularly on the outer circumferential side of the circumferential wall 91b of the rotary door 91, first, one end of the length L of the film member 92 is bent toward the inner diameter with a predetermined length including the mounting hole 92b to form a bent portion 92k. In this state, the film member 92 is placed so as to cover the circumferential wall 91b of the rotary door 91 from the top, and the circular mounting hole 92b on one end side of the film member 92 is fitted in the pin member 91g. On the other hand, the slot-like slide hole 92c on the other end side of the film member 92 is fitted in the pin member 91i of the slide wall portion 91h.

Then, the head portion of the resin-made pin member 91g is thermally caulked till the film member 92 is pressed to the surface of the rotary door 91 so that the head portion of the pin member 91g is enlarged in the form of a rivet. In this way, the bent portion 92k on one end side of the film member 92 can be secured to one end in the circumferential direction of the circumferential wall 91b of the rotary door 91. That is, the end portion 92k on one end side of the film member 92 becomes a fixed end.

Similarity, the head portion of the resin-made pin member 91i of the slid wall portion 91h is thermally caulked. An amount of deformation of The thermally caulked portion of the head portion of the pin member 91i in an axial direction of the pin is set to be slight whereby a clearance (see FIGS. 2 and 3) is formed between the film member 92 and the outer circumferential surface of the slide wall portion 91h. In this way, the other end in the circumferential direction of the film member 92 is not secured to the outer circumferential surface of the slide wall portion 91h but the circumferential movement thereof is free within the range of the dimension in the longitudinal direction of the slide hole 92c. That is, the other end in the circumferential direction of the film member 92 becomes a movable free end 92d.

The other end in the circumferential direction of the film member 92 is a movable free end 92d as described above, it is necessary to select a material of relatively high rigidity (the flexible value is equal to 240 g or more) for the film member 92 in order to prevent an excessive slack in the film member 92 from being caused due to air pressure and vibrations. The length (circumferential length) L of the film member 92 is dimensioned slightly longer than the length obtained by adding the bent portion for mounting one end and the portion for forming the slot-like slide hole 92c at the other end to the imaginary circumferential length determined in the range in which the circular surface formed with the air passage opening portions 5, 6 and 7 on the side of the case 1 (the circular surface having the curvature radius larger with a predetermined amount than the circumferential wall 91b of the rotary door 91) crosses the extension line of a plane opening portion 91j of the rotary door 91, as understood from FIG. 3.

Figure 5:
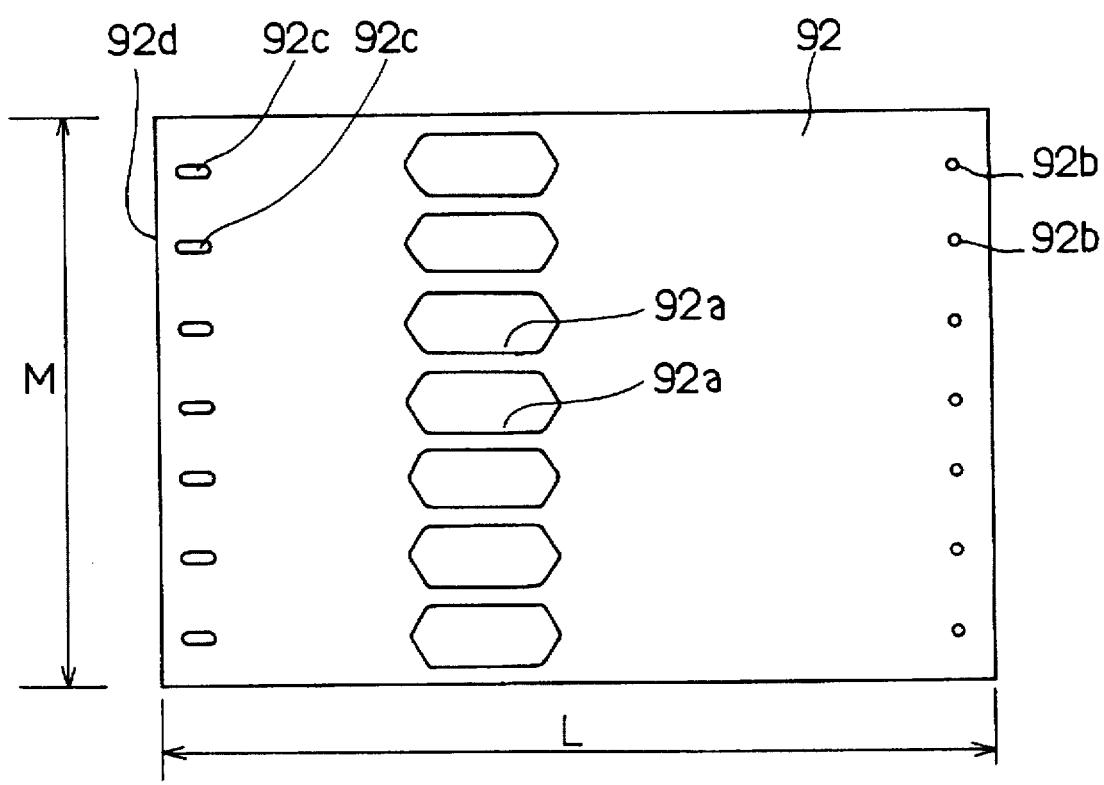
FIG. 5 is an developed plan view of a film member.
Figure 6:
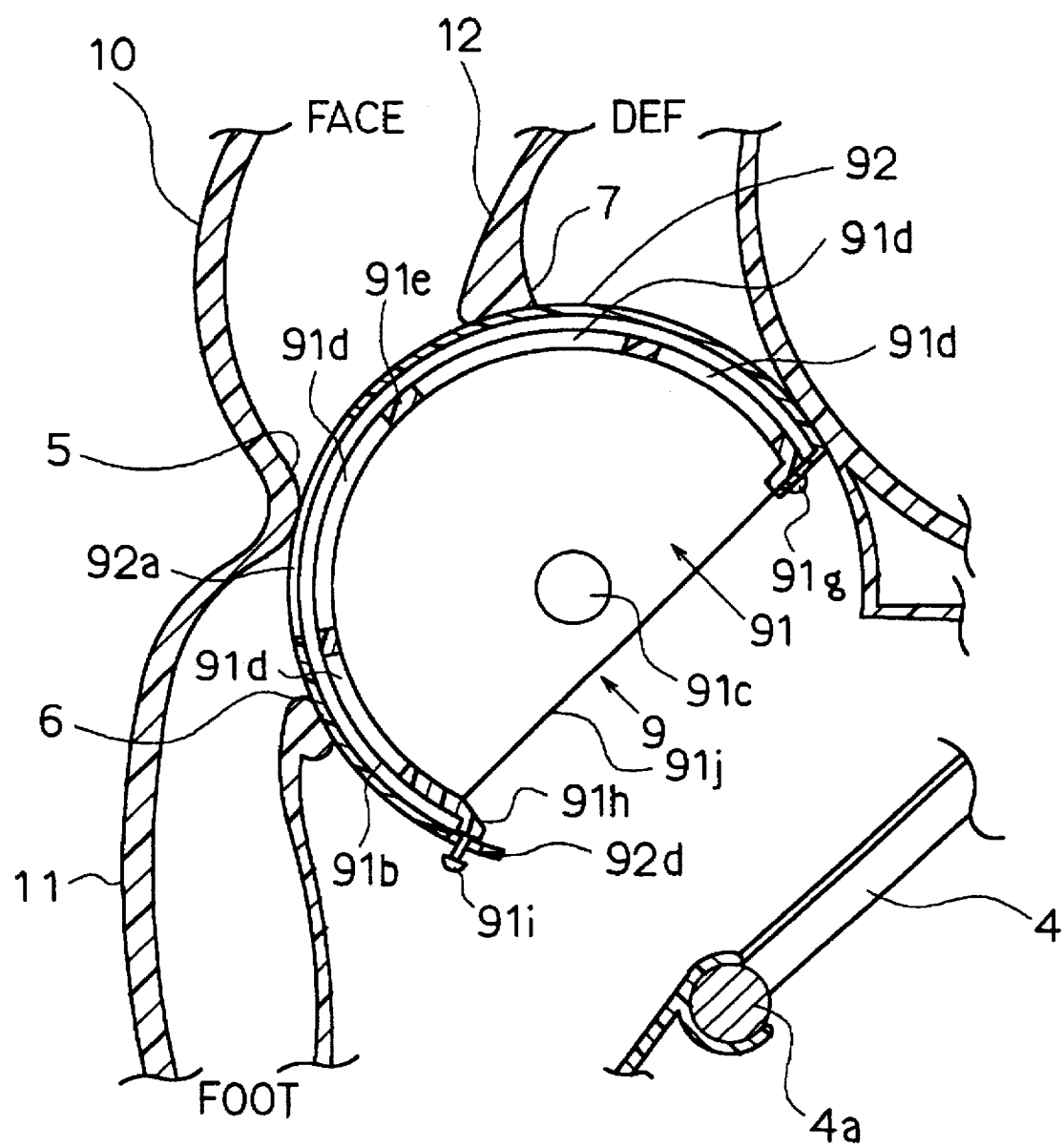
FIG. 6 is a cross sectional view showing an operating state of an air passage switching device in a hi-level mode.

In this way, the film member 92 is maintained to be circular in shape along the circular surface formed with the air passage opening portions 5, 6 and 7 on the side of the case 1 due to its own rigidity and air pressure received from the inner circumferential side. The film member 92 may be formed in a circular shape in advance, instead of the one in which a flat shape shown in FIG. 5 is curved into a circular shape. In the circular film member 92, a sealing function for closing the air passage opening portions 5, 6 and 7 can be improved.

The opening portion 92a of the film member 92 overlaps with the door vent opening 91d located on the second position in the clockwise direction from the left end in the circumferential direction in FIGS. 1 and 3, out of three vent openings 91d of the rotary door 91, so that the inner and outer circumferential portions of the rotary door portion are opened at the film opening portion 92a.

In the rotary door 91 constructed as described above, the rotary shaft 91c of both the end plates 91a is rotatably supported on the wall of the case 1 so as to coincide with the curvature center of the circular inner wall surface in which the air passage opening portions 5, 6 and 7 on the side of the case 1 are arranged. In this case, a lever 21 is secured to one of the rotary shafts 91a as shown in FIG. 1, and one end of a control cable 22 is connected to the end of the lever 21. The other end of the control lever 22 is connected to a blow mode switching lever (blow mode switching operating means) provided on an air conditioning control panel (not shown) within the passenger compartment. The rotary door 91 is rotatively displaced in the rotational direction (in directions of arrows D and E in FIG. 1) by the manual operation of the blow mode switching lever.

An operation of the above-described construction will be described hereinafter. When the blower 2 is actuated, air flows into the case as in arrows A, B and C in FIG. 1. The blown-out air flows from the plane opening portion 91j of the rotary door 91 to the inner circumferential side of the rotary door 91, in which cool air and hot air are mixed. Then, the blown-out air passes through the vent opening 91d of the rotary door 91 and the opening portion 92a of the film member 92 and flows from one or plural air passage opening portions 5, 6 and 7 on the side of the case 1, which overlap(s) with the film opening portion 92a, to the air outlet from which the air is blown out into the passenger compartment.

At this time, the film member 92 protrudes so as to expand outerward by air pressure and is pressed against the peripheral edges of the air passage opening portions 5, 6 and 7 to seal these opening portions, thus closing the opening portion certainly without causing a leakage of air.

Further, since the circumferential wall 91b of the rotary door 91 has the circular range of approximately 180 degrees, the opening area of the plane opening portion 91j which is an air suction inlet of the door is maximized, thus contributing to make air flow resistance small.

In this embodiment, when the user manually operates the blow mode switching lever within the vehicle, its operating force is directly transmitted to the rotary door 91 through the control cable 22 and the lever 21 so that the rotary door 91 is rotated in the direction of arrow D or E. At this time, more specifically, the rotary door 91 is rotatively displaced to the respective fixed positions in FIG. 3 and FIGS. 6 to 9 so as to select one of five blow modes. Further, the blow mode switching lever in this embodiment is movable in a width direction of the vehicle. The lever can be moved with every equal amount from left to right of the vehicle in order to select the face mode, the bi-level mode, the foot mode, the foot-def mode and defroster mode as the fixed blow modes in the order. That is, the rotary door 91 is rotated in proportional to the operating amount of the blow mode switching lever.

Next, the aforementioned blow modes will be described. First, the FACE mode will be described with reference to FIG. 3. When the blow mode switching lever is positioned at the left-most position in a width direction of the vehicle and the face mode is selected, the rotary door 91 is rotated along with the film member 92 to the position indicated in FIG. 3, and as a result, the opening portion 92a of the film member 92 completely overlaps with the air passage opening portion 5 for face. In this state, the portion not provided with the opening portion 92a, out of the film member 92, protrudes toward outer circumferential side due to air pressure whereby it is certainly brought into pressure contact with the peripheral edge of the air passage opening portion for foot 6 and the air passage opening portion for defroster 7, and both the opening portions 6 and 7 are certainly closed.

In this way, air in the case 1 is taken from the plane opening portion 91j of the rotary door 91 into the door, flows from the air passage opening portion for face 5 into the face duct 10 through the door vent opening 91d and the film opening portion 92a, and is blown out into the passenger compartment from the face air outlet opening portion.

Figure 7:
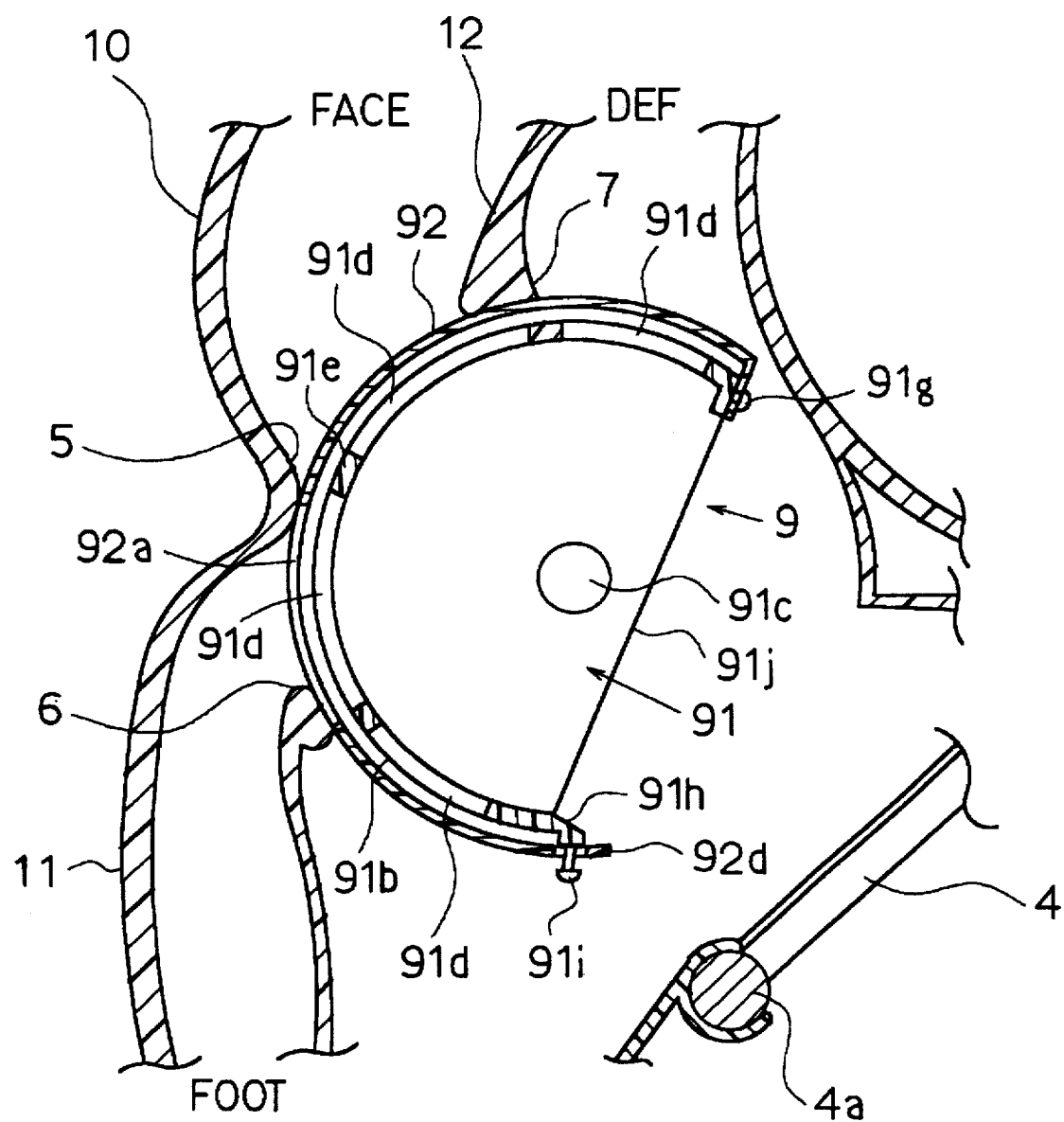
FIG. 7 is a cross sectional view showing an operating state of an air passage switching device in a foot mode.

Next, the bi-level (B/L) mode will be described with reference to FIG. 7. In the bi-level mode, the rotary door 91 is rotated with only a predetermined angle in a counter-clockwise direction from the state of the face mode in FIG. 3 whereby the opening portion 92a of the film member 92 overlaps with both the half of the air passage opening portion for face 5 and the half of the air passage opening portion for foot 6.

At this time, the air passage opening portion for defroster 7 is certainly closed by the portion not provided with the opening portion 92a, out of the film member 92.

Air in the case 1 is thus taken from the plane opening portion 91j of the rotary door 91 into the door, flows into the air passage opening portion for face 5 and the air passage opening portion for foot 6 through the door vent opening 91d and the film opening portion 92a, and is blown out into the passenger compartment simultaneously from both the face air outlet and the foot air outlet.

Next, the FOOT mode will be described with reference to FIG. 7. In this case, the rotary door 91 is rotated in the counterclockwise direction from the bi-level mode state in FIG. 6 and further rotated with a predetermined angle, whereby the film opening portion 92a completely overlaps with the air passage opening portion 6, and the air passage opening portion for face 5 is completely closed. On the other hand, in this embodiment, the air passage opening portion for defroster 7 is not completely closed but air in the case 1 is slightly leaked from the air passage opening portion for defroster 7 through a clearance having a predetermined amount as shown in FIG. 7 to improve the defrosting effect of windshield.

Figure 8:
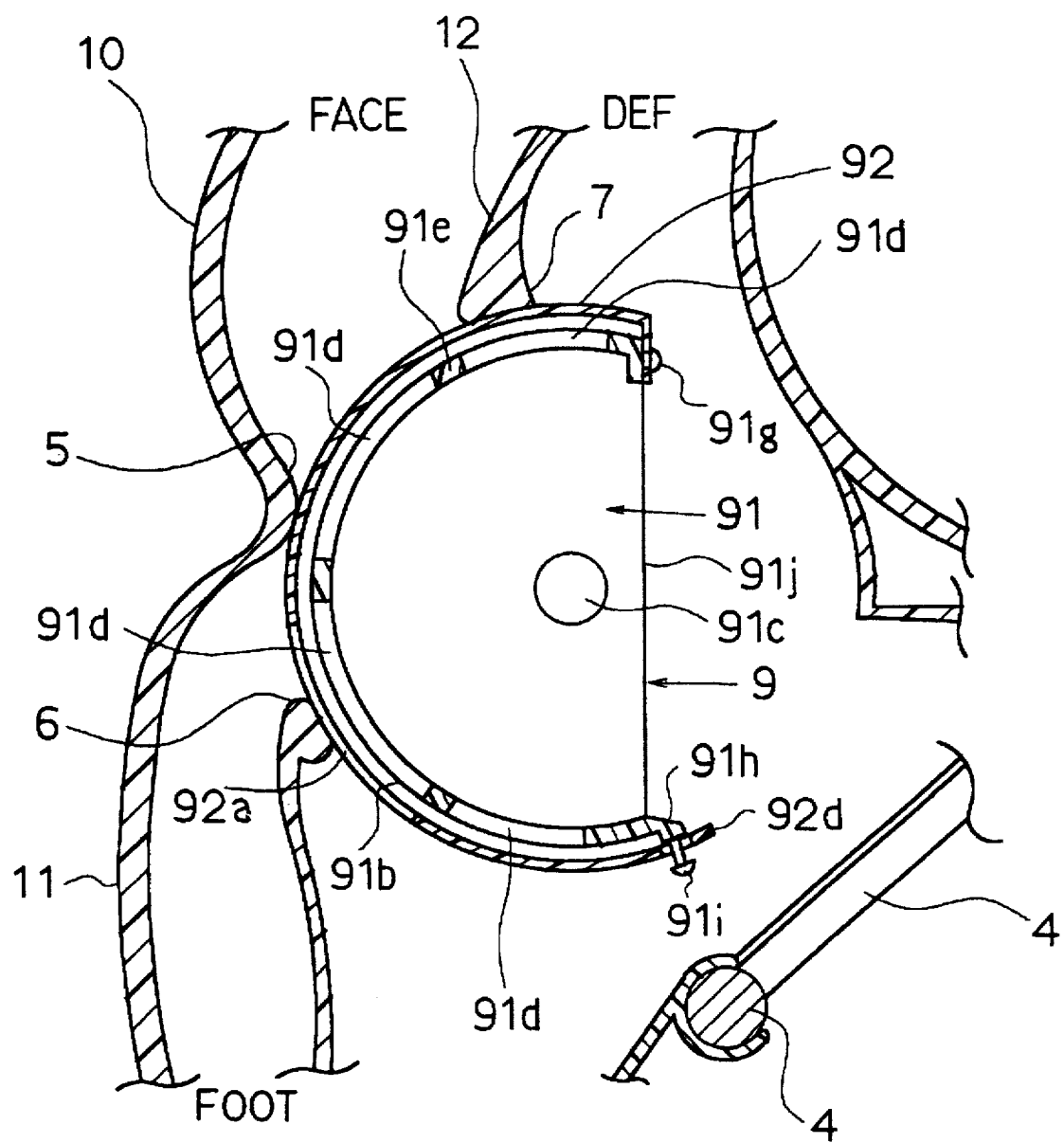
FIG. 8 is a cross sectional view showing an operating state of an air passage switching device in a foot/def mode.

Next, the foot/def (F/D) mode will be described with reference to FIG. 8. In this case, the rotary door 91 is rotated in the counterclockwise from the foot mode state in FIG. 7 and further rotated through fixed angle, whereby the film opening portion 92a overlaps with approximately half of the air passage opening portion for foot 6, and the side end of the pin member 91g of the rotary door 91 opens approximately half of the air passage opening portion for defroster 7.

The air passage opening portion for face 5 is fully closed by the portion not provided with the opening portion 92a, out of the film member 92. As a result, blown-out air will be an air flow which goes round the rotary door 91 and directly flows into the air passage opening portion for defroster 7, an air flow which flows into the air passage opening portion for foot 6 through the film opening portion 92a, and an air flow which flows into the door through the film opening portion 91d and the film opening portion 92a and thereafter again flows into the air passage opening portion for foot 6 through the door vent opening 91d and the film opening portion 92a.

Figure 9:
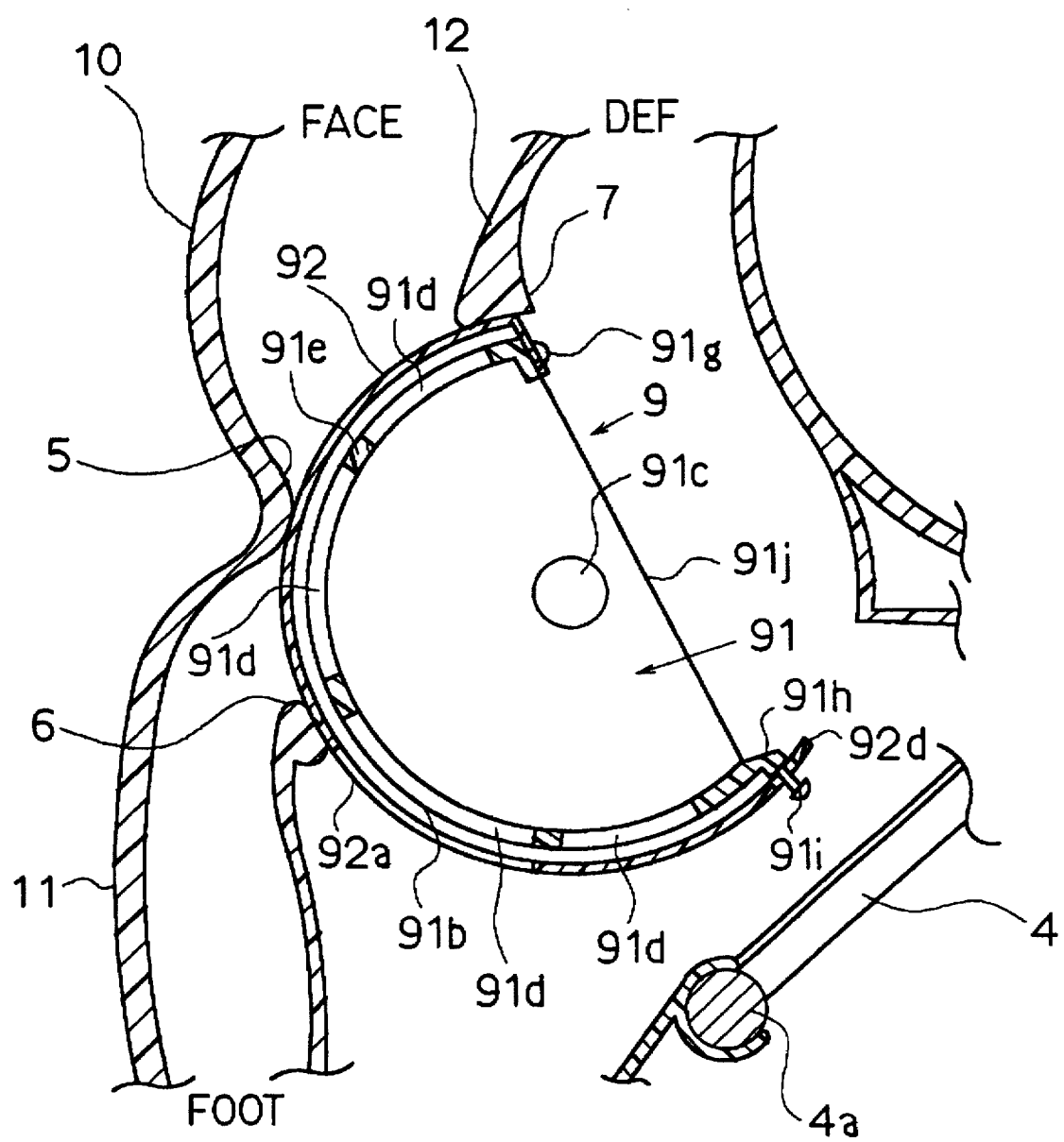
FIG. 9 is a cross sectional view showing an operating state of an air passage switching device in a defroster mode.

Finally, the defroster (DEF) mode will be described with reference to FIG. 9. In the defroster mode, the rotary door 9 is further rotated in the counterclockwise direction with a predetermined angle from the state of the foot/def mode. Thereby, the side end of the pin member 91g of the rotary door 91 completely opens the air passage opening portion for defroster 7. At the same time, the air passage opening portions for face and foot 5 and 6 are fully closed by the portion not provided with the opening portion 92a, out of the film member 92.

As a result, blown-out air in the case 1 flows into only the air passage opening portion for defroster 7, and is blown out from the defroster air outlet toward the inner surface of the windshield through the defroster duct 12 to prevent the windshield from being clouded.

As will be apparent from the description of the blow switching operation in FIG. 3 and FIGS. 6 to 9 as described above, the free end 92d of the film member 92 (the side end of the slide hole 92c is always set to the end on the side positioned outside the opening range of plural air passage opening portions 5, 6 and 7, in the rotational area of the rotary door 91. Therefore, even if the slide wall portion 91h of the rotary door 91 and the resin-made pin member 91i are arranged on the side of the free end 92d of the film member 92, these members 91b and 91i is never caught with partition walls of the air passage opening portion 5, 6 and 7 of the case 1, and the rotational action of the rotary door 91 is not impaired at all.

Since one end in the circumferential direction of the film member 92 is the free end 92d movable on the slide wall portion 91h of the rotary door 91, even if the variation in dimension of the film member 92 or the air passage opening portions 5, 6 and 7 of the case 1 occurs, the free end 92d of the film member 92 can slide on the slide wall portion 91h in the direction of offsetting the variation in dimension.

Therefore, for example, in the case where the circumferential length of the film member 92 is less than the design dimension, the free end 92d of the film member 92 slides upward in FIG. 3 (inwardly in the circumferential direction of the rotary door 91) whereby the film member 92 can be certainly brought into pressure contact with the inner wall surface of the case 1 by receiving the air pressure, and the defective seal can be avoided.

Further, in the case where the circumferential length of the film member 92 is longer than the design dimension, the free end 92d of the film member 92 is slidably moved downward in FIG. 3 (outward in the circumferential direction of the rotary door 91, whereby it is possible to prevent the film member 92 from being wrinkled, thus preventing the occurrence of noise as well as the inconveniences such as defective seal due to the wrinkles.

Even though one end in the circumferential direction of the film member 92 is the free end 92d, as a result of the study made by the inventors, it has been confirmed that the rigidity of the film member 92 is enhanced (the aforementioned flexible value is equal to 240 g or more) whereby the inconveniences such that the film member 92 partially enters plural air passage opening portions 5, 6 and 7 will not occur. When the rigidity of the film member 92 is excessively enhanced, the flexibility of the film member 92 is lowered and the seal performance is also lowered. It is therefore preferable that the flexible value of the film member 92 is equal to 1930 g or less.

In the above-described first embodiment, if the rigidity of the film member 92 is suitably selected, the movement of the film member 92 toward the outside in a radial direction on the free end side need not be restrained, and the pin member 91i can be eliminated.

Figure 10:
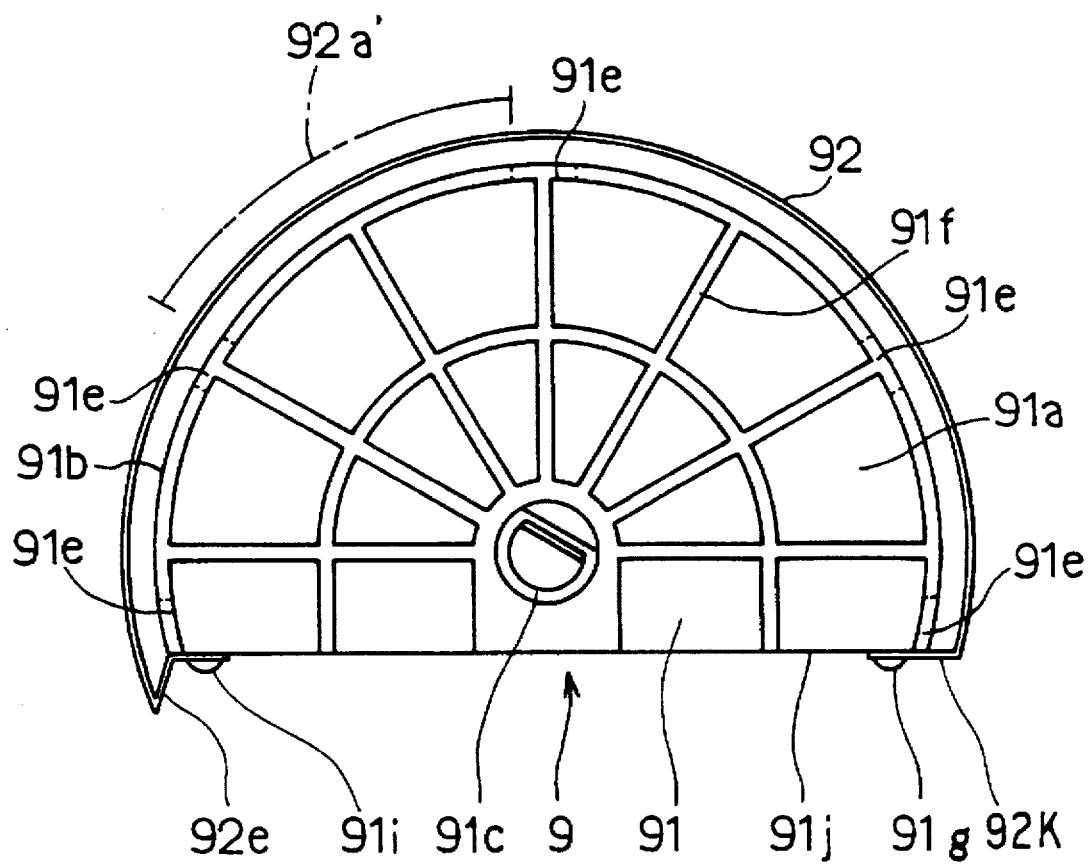
FIG. 10 is a side view of a rotary door portion showing a second embodiment.
Figure 11:
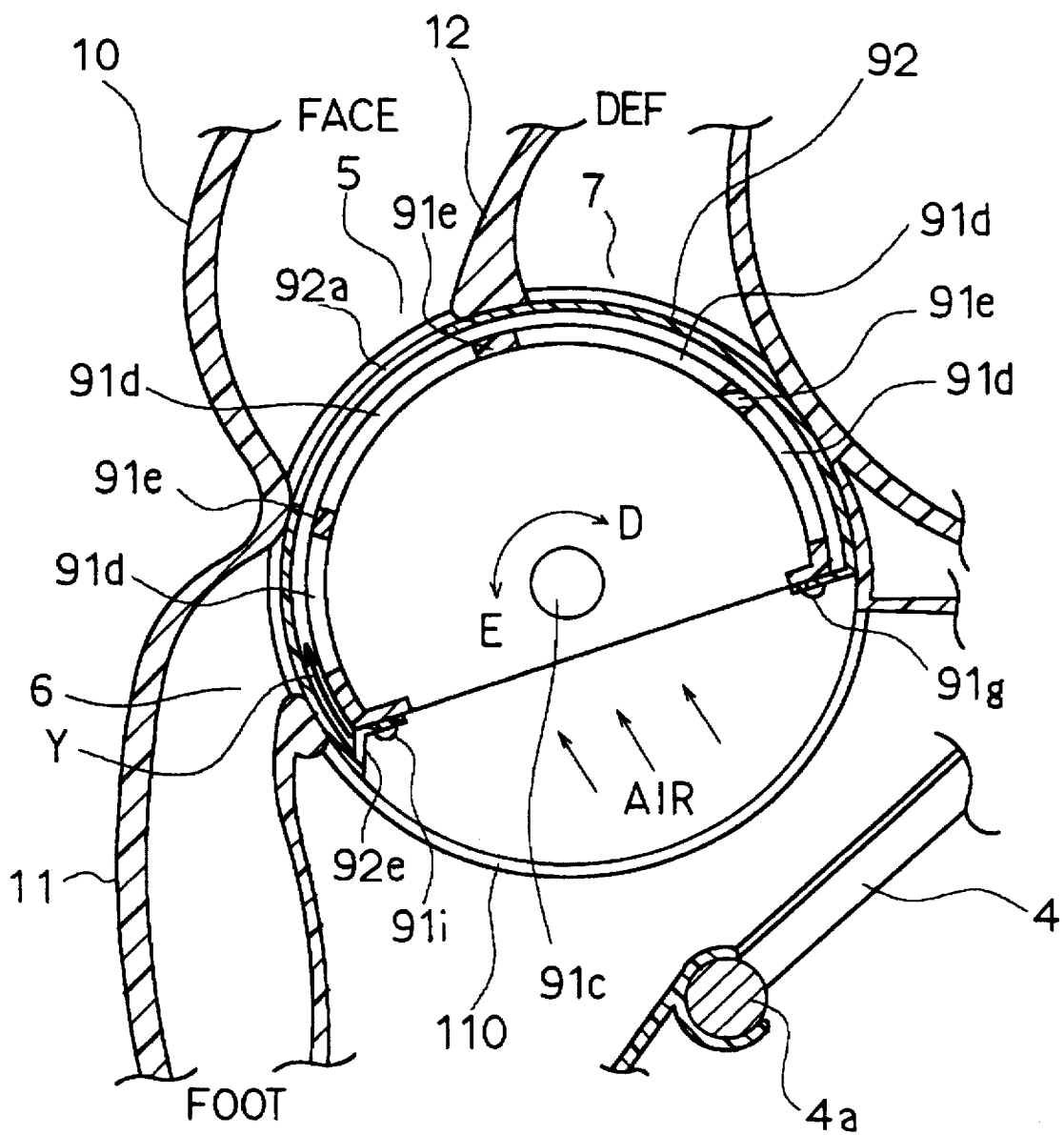
FIG. 11 is a schematic cross sectional view of a main portion of an automotive air conditioning apparatus into which a rotary door is assembled.
Figure 12:
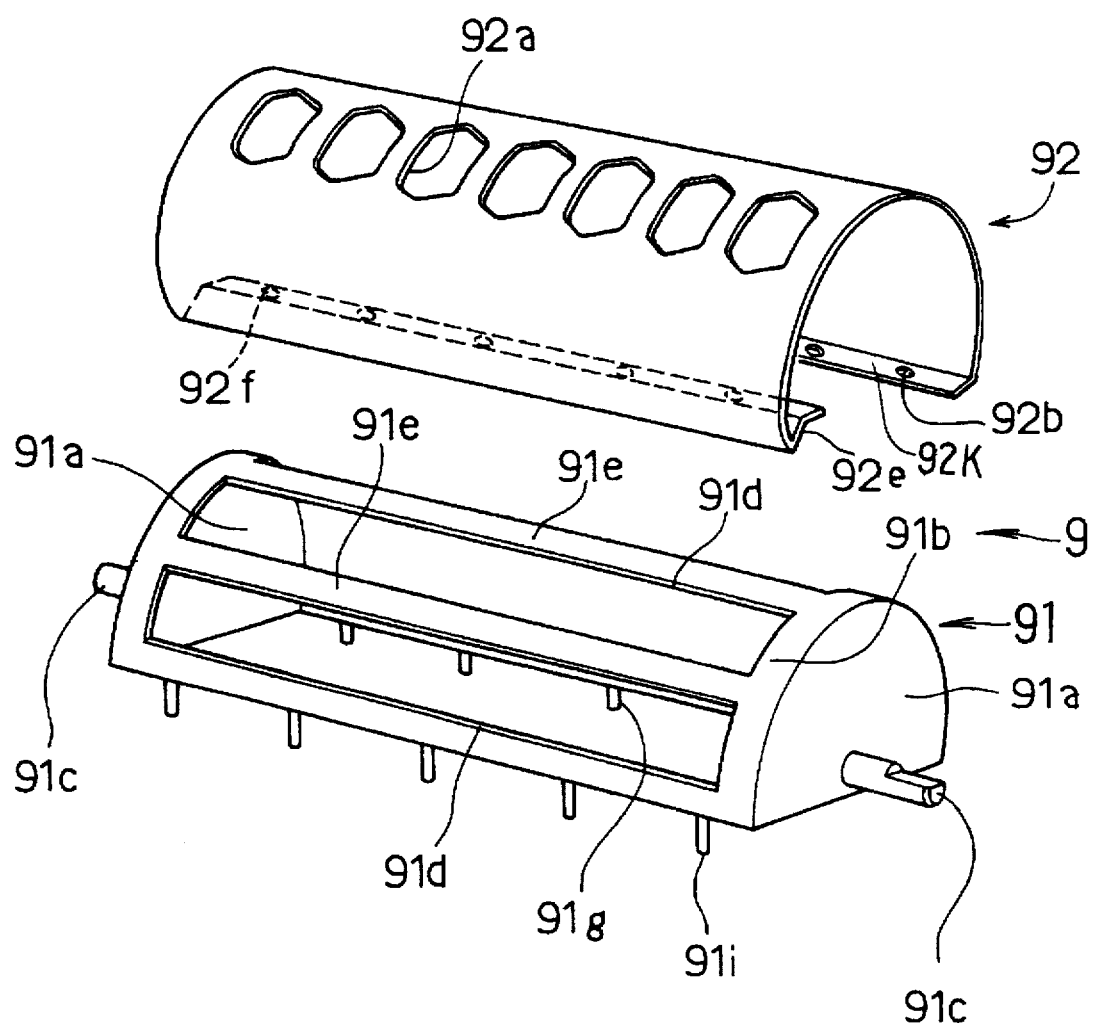
FIG. 12 is an exploded perspective view of a rotary door in the second embodiment.

FIGS. 10 to 12 shows a second embodiment in which one end in the circumferential direction of the film member 92 is not a free end as in the first embodiment but a V-shape spring mechanism portion 92e is formed.

The second embodiment will be described in detail. One end in the circumferential direction of the film member 92 is secured to the rotary door 91 having the same construction as that of the first embodiment. On the other hand, the other end in the circumferential direction of the film member 92 is formed of a V-shape spring mechanism portion 92e.

In this embodiment, a top end of the spring mechanism portion 92e is further bent parallelly with a lower end of the rotary door 91 (an end surface formed with a plane opening portion 91j), and a circular mounting hole 92f is bored in the bent portion, the mounting hole 92f being fitted in a pin member 91i provided on the lower end of the rotary door 91, the pin member 91i being thermally caulked, and the top end of the spring mechanism portion 92e is secured to the lower end of the rotary door 91.

The position at which the V-shaped spring mechanism portion 92e is provided is always set to the end on the side positioned outside the opening range of the plural air passage opening portions 5, 6 and 7 in the rotational area of the rotary door 91 for the similar reason to that of the free end 92d in the first embodiment.

A cylindrical guide portion 110 (see FIG. 11) for guiding the film member 92 and maintaining a circular shape of the film member 92 is projected from the parts positioned at both ends in an axial direction of the rotary door 91 in the inner wall of the case 1. The axial projecting amount from the inner wall of the case 1 of the cylindrical guide portion 110 may be a minute amount, for example, about 8 mm. The radius of the inner peripheral surface of the cylindrical guide portion 110 is slightly larger than that of the rotary door 91 as shown in FIG. 1.

The circumferential length of the inner circumferential surface of the cylindrical guide portion 110 and the circumferential length of the film member 92 determined by the angle (radian) of circumference of the circular shape of the rotary door 91 is relatively long for the film member 92 with a predetermined value in consideration of the variation in dimension of these parts.

The circumferential surplus length portion of the film member 92 can be eliminated by deformation of the V-shaped spring mechanism portion 92e. In this case, the impact (the circumferential force indicated by arrow Y in FIG. 11) of absorption of the surplus length by the spring mechanism portion 92e is generated in the film member 92. This impact force is a component in the radial direction of the film member to press the film member 92 against the peripheral edges of the plural air passage opening portions 5, 6 and 7.

According to the present invention, the film member 92 is further certainly brought into pressure contact with the peripheral edges of the air passage opening portions 5, 6 and 7 by always applying the impact force by the spring mechanism portion 92e in addition to the air pressure. Therefore, even in the state where the amount of air by the blower 2 lowers and the air pressure is lowered, the pressing of the film member 92 is effected by the function of the impact force by the spring mechanism portion 92e to improve the seal performance. Further, at the time of a large amount of air, the force for bringing the film member 92 into pressure contact is enhanced by both the impact force of the spring mechanism portion 92e and air pressure to improve the seal performance.

Further, the variation in dimension of the film member 92 or the like and the variation in dimension due to the change caused by the time passage of many years can be eliminated by the deformation of the spring mechanism portion 92e, and accordingly, the defective seal, the occurrence of noise caused by the film member 92 can be prevented.

Figure 13:
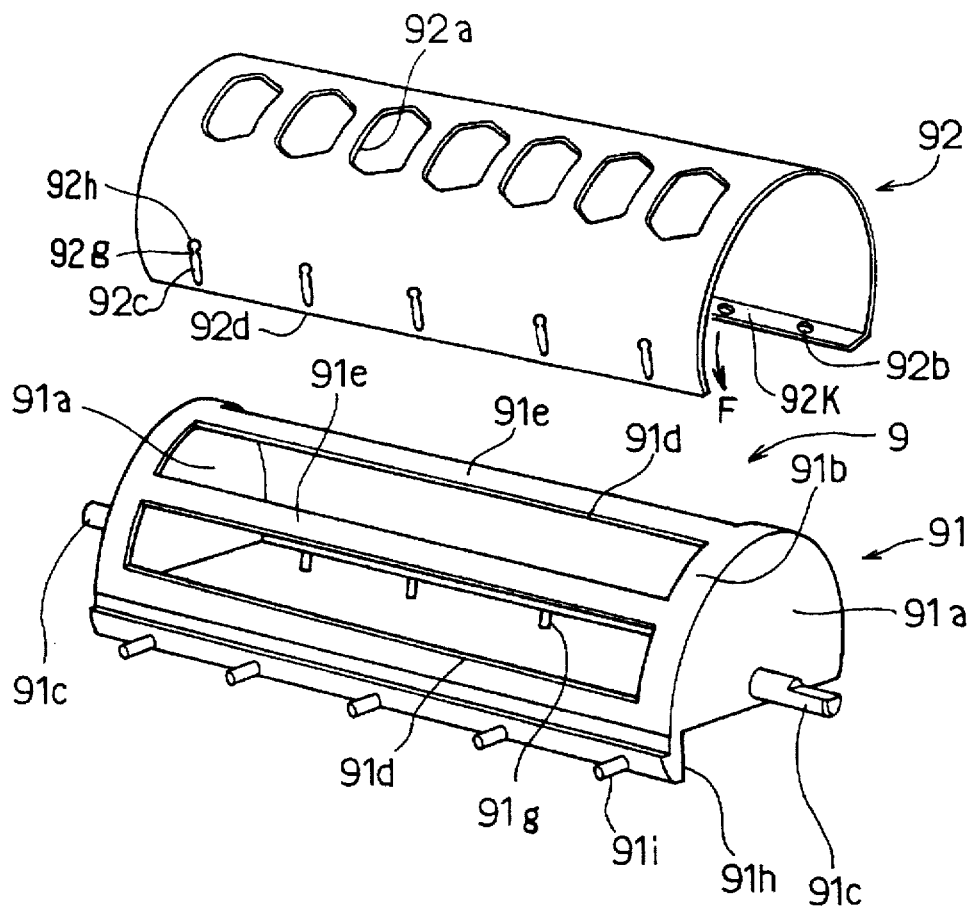
FIG. 13 is an exploded perspective view of a rotary door portion showing a third embodiment of the present invention.
Figure 14:
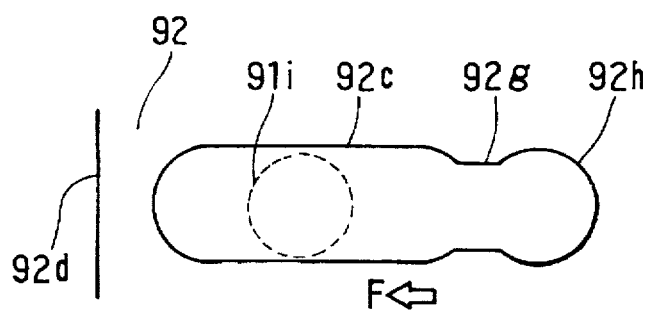
FIG. 14 is a developed plan view of a main portion of a film member showing the third embodiment of the present invention.
Figure 15:
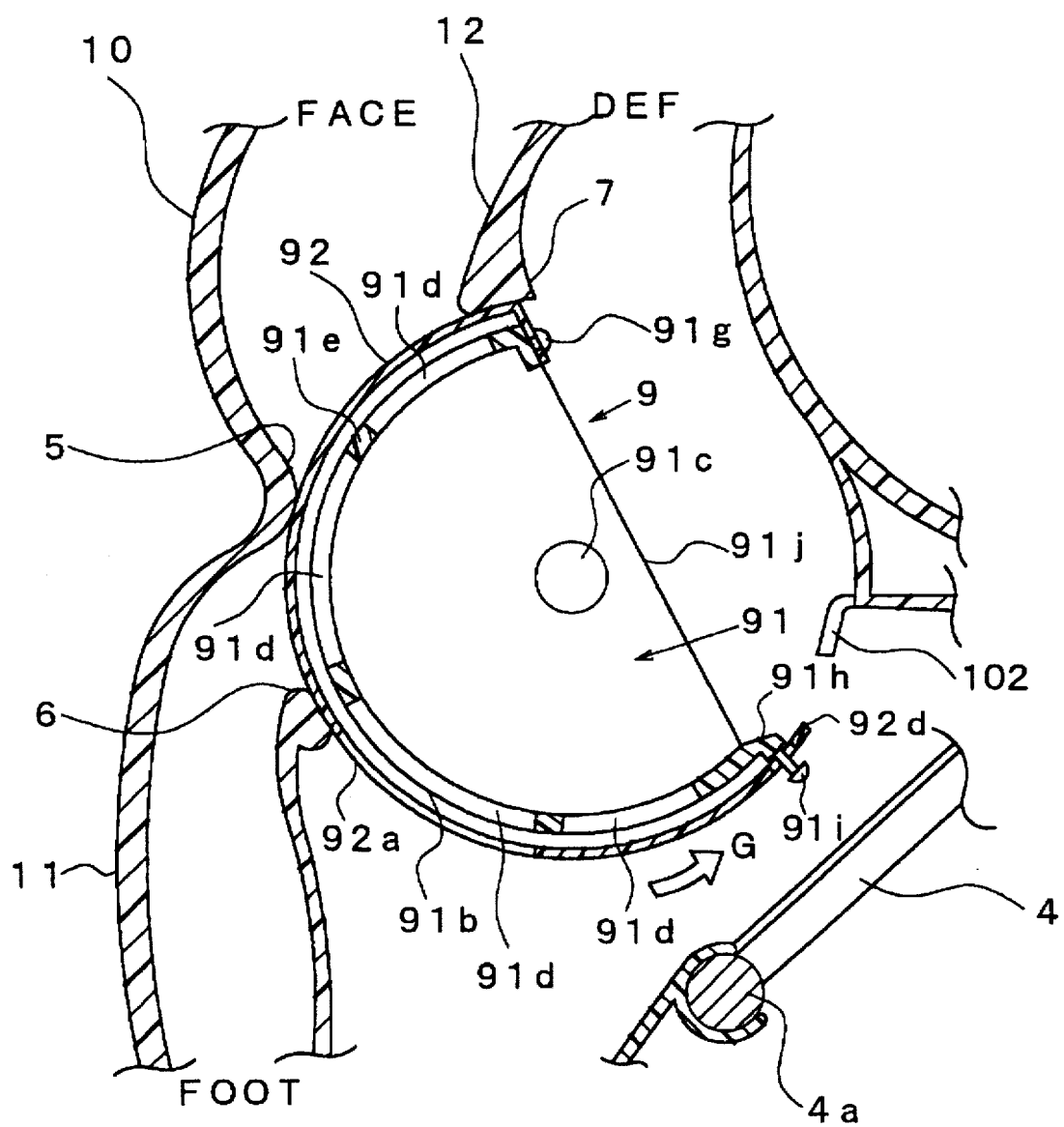
FIG. 15 is a schematic cross sectional view of the main portion of an automotive air conditioning apparatus according to the third embodiment of the present invention.
Figure 16:
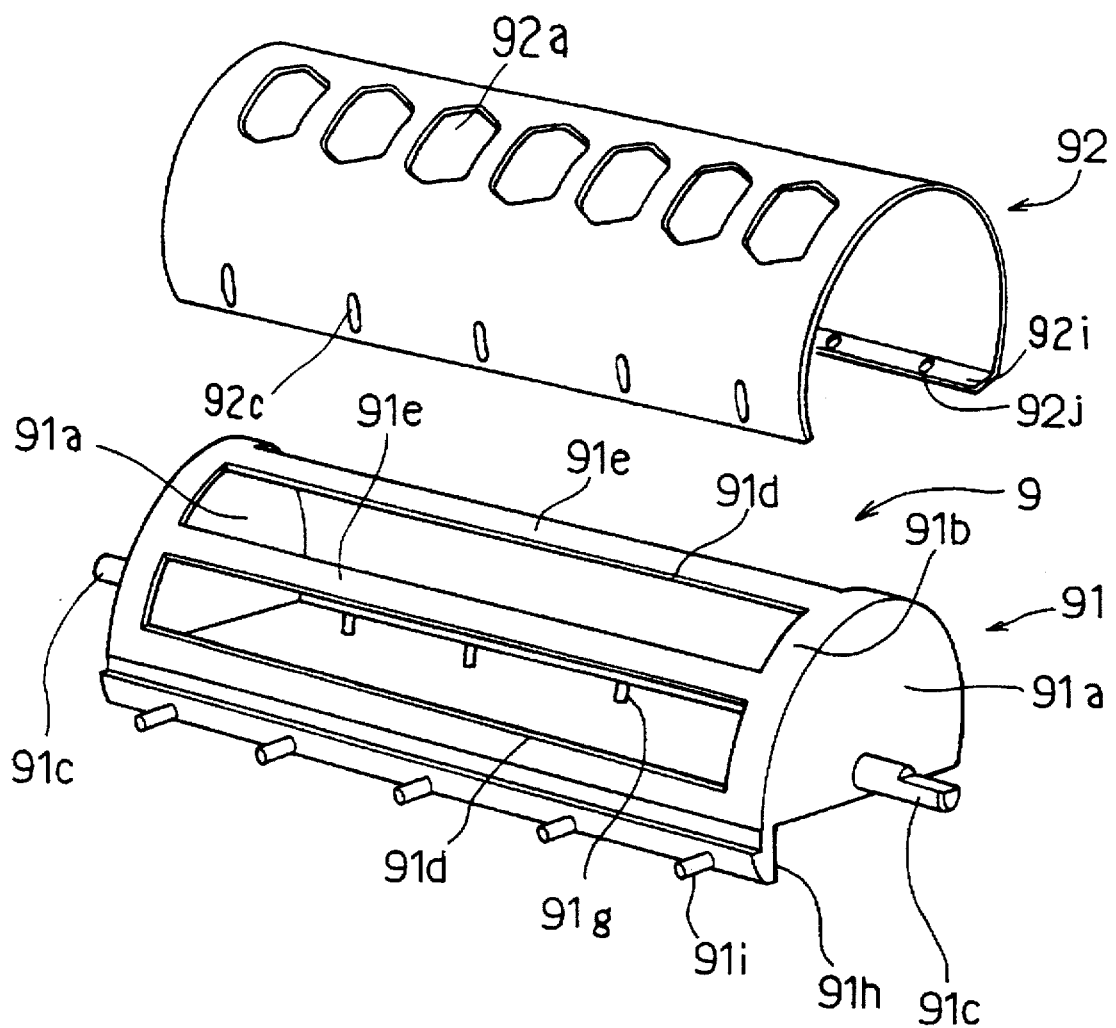
FIG. 16 is an exploded perspective view of a rotary door portion showing a fourth embodiment of the present invention.

FIGS. 13 to 15 show a third embodiment, which is intended to improve an assembling performance of the rotary door 91 into the case 1 in the first embodiment.

In the first embodiment, when the rotary door 91 is mounted in the case 1, the free end 92d of the film member 92 is freely movable, and the circular shape of the film member 92 is equal to the circular shape of the inner wall surface of the case 1. Therefore, the film member 92 is caught with the protrusion of the inner wall of the case 1 to impair the assembling performance of the rotary door 91 and may damage the film member 92.

In the third embodiment, when the rotary door 91 is mounted in the case 1, the free end 92d of the film member 92 is temporarily locked at the rotary door 91 in the state where the film member 92 is moved close to the outer peripheral surface of the rotary door 91, that is, in the state where the diameter of the circular shape is reduced.

Therefore, the following construction is added to the shape of the slot-like slide hole 92c provided adjacent to the free end 92d of the film member 92 in the first embodiment. That is, as shown in FIGS. 13 and 14, a restricted portion 92g which is smaller in width than the diameter of the pin member 91i of the rotary door 91 is provided at the end opposite to the free end 92d, out of the longitudinal end portions of the slide hole 92c.

There is provided a circular stopping hole 92h communicated with the restricted portion 92g along the extension of the longitudinal end of the slide hole 92c. A size of the stopping hole 92h is set in such a manner that the pin member 91i is fitted in and stopped at the pin member 91i.

Further, there is provided on the side of the case 1 a stopper piece 102 which can be brought into contact with the free end 92d at the part on the rotational locus in the counterclockwise direction of the film member 92 in FIG. 15 (at the portion not impairing the blow mode switching operation by the rotation of the rotary door 91). The stopper piece 102 is preferably formed integrally with resin-made case 1, however, in a case where it is difficult to form the stopper piece 102 integrally with the case 1, the stopper piece 102 may be made of a separate part fixed to an inner wall of the case 1 by means such as adhesion.

As constructed above, according to the third embodiment, when the film member 92 is assembled in the rotary door 91, the mounting hole 92b at one end of the film member 92 is fitted in the pin member 91g of the rotary door 91, and one end of the film member 92 is secured to the rotary door 91. Then, before mounting into the case 1, the free end 92d of the film member 92 is pulled in the direction of arrow F in FIGS. 13 and 14, the stopping hole 92h of the slide hole 92c is fitted in the pin member 91g of the rotary door 91 while reducing the diameter of the circular shape of the film member 92.

The stopping hole 92h is a circular hole having an outer diameter substantially equal to that of the pin member 91g and is communicated with the slide hole 92c through the restricted portion 92g smaller in diameter than the pin member 91i so that the fitting and stopping state of the stopping hole 92h and the pin member 91g is certainly maintained by the restricted portion 92g and the free end 92d of the film member 92 is temporarily immovably locked by the pin member 91g of the rotary door 91.

In this locked state, the diameter of the circular shape of the film member 92 is reduced, and when the rotary door 91 is inserted into and assembled in the case 1, such a assembling operation can be easily performed, and an inconvenience in which the film member 92 is caught with the protrusion on the side of the case 1 and is damaged can be solved.

When the rotary door 91 is further rotated in a direction of arrow G with a predetermined angle from the defroster mode position shown in FIG. 15 after the rotary door 91 has been assembled in the case 1, the free end 92d of the film member 92 collides with the stopper piece 102 of the case 1 to stop the movement of the film member 92. Accordingly, when the rotary door 91 is further rotated in a direction of arrow G from the rotated position, the pin member 91i of the rotary door 91 elastically deforms the restricted portion 92g so as to pass through the restricted portion 92g and enter the area of the slide hole 92c. The pin member 91i is set to be in a movable state within the slide hole 92c. That is, the locked state of the free end 92d of the film member 92 is released. Then, the free end 92d is placed in the movable state, and the film member 92 can be operated relative to the rotary door 91 similarly to the first embodiment.

Also in the third embodiment, in the case where the free end 92d of the film member 92 is temporarily locked at the rotary door 91, the position of the stopping hole 92h is set in the dimensional relation in which a clearance having a predetermined amount is set between the film member 92 and the outer circumferential surface of the rotary door 91, whereby the variation in dimension of the film member 92 can be eliminated. The variation in dimension is generally larger in the case 1 than in the film member 92. However, the variation in dimension of the case 1 can be well eliminated similarly to the first embodiment by assembling the rotary door 91 in the case 1, then releasing the locked state of the free end 92d and setting the free end 92d to the movable state.

FIGS. 16 to 19 show a fourth embodiment, in which the variation of the operating force of the rotary door 91 in the first embodiment is reduced.

In the first embodiment, when the film member 92 is assembled in the rotary door 91, one end of the film member 92 (the mounting hole 92b portion) is secured to the rotary door 91 in the immovable state and the other end of the film member 92 is the movable free end 92d. Thus, there occurs a problem in that the door operating force greatly varies according to the rotational direction of the rotary door 91.

First, the cause of the variation of the door operating force will be described with reference to a schematic view of FIG. 19. When the rotary door 91 is rotated in the counterclockwise direction H with the shaft 91c as the center 0, the rotating force of the rotary door 91 is transmitted from the fixed end ① on one side (mounting hole 92b portion) of the film member 92 to the film member 92. During the operation of the air conditioner, the film member 92 receives the pressure of blown-out air from the inside thereof and generate a frictional force is generated between the film member 92 and the inner wall surface of the case 1.

Since the film member 92 is formed of a flexible material and not rigid, even if the fixed end side ① (mounting hole 92b portion) of the film member 92 tends to be moved simultaneously with respect to the rotation of the rotary door 91, the side of the free end (92d) side ② of the other end of the film member 92 is delayed to move. That is, after the fixed end ① of the film member 92 is moved with a predetermined length from position α to position β, the free end side ② starts to move.

Therefore, a slack portion occurs in the circular shape of the film member 92 at the fixed end ① due to the rotation of the rotary door 92 in the counterclockwise direction H, and the slack portion is strongly pressed against the inner wall surface of the case 1 so that the operating force of the rotary door 91 increases.

On the other hand, when the rotary door 91 is rotated in the clockwise direction I, the free end side ② first starts to move after the fixed end ① of the film member 92 is moved from position α to position γ. The diameter of the circular shape of the film member 92 is conversely reduced due to the delay of movement of the free end side ②. Since the frictional force between the film member 92 and the inner wall surface of the case 1 reduces, the operating force of the rotary door 91 also reduces.

It has been found that one end (mounting hole 92b) side ① is set to be the fixed end and the other end side ② is set to be the free end whereby the door operating force greatly varies due to the change of the rotational direction of the door caused by the delay of movement of the free end side ②.

As described above, in the fourth embodiment, one end (mounting hole 92b) side ① is not set to be the fixed end but set to be the radially movable free end of the circular shape of the film member 92.

Figure 17:
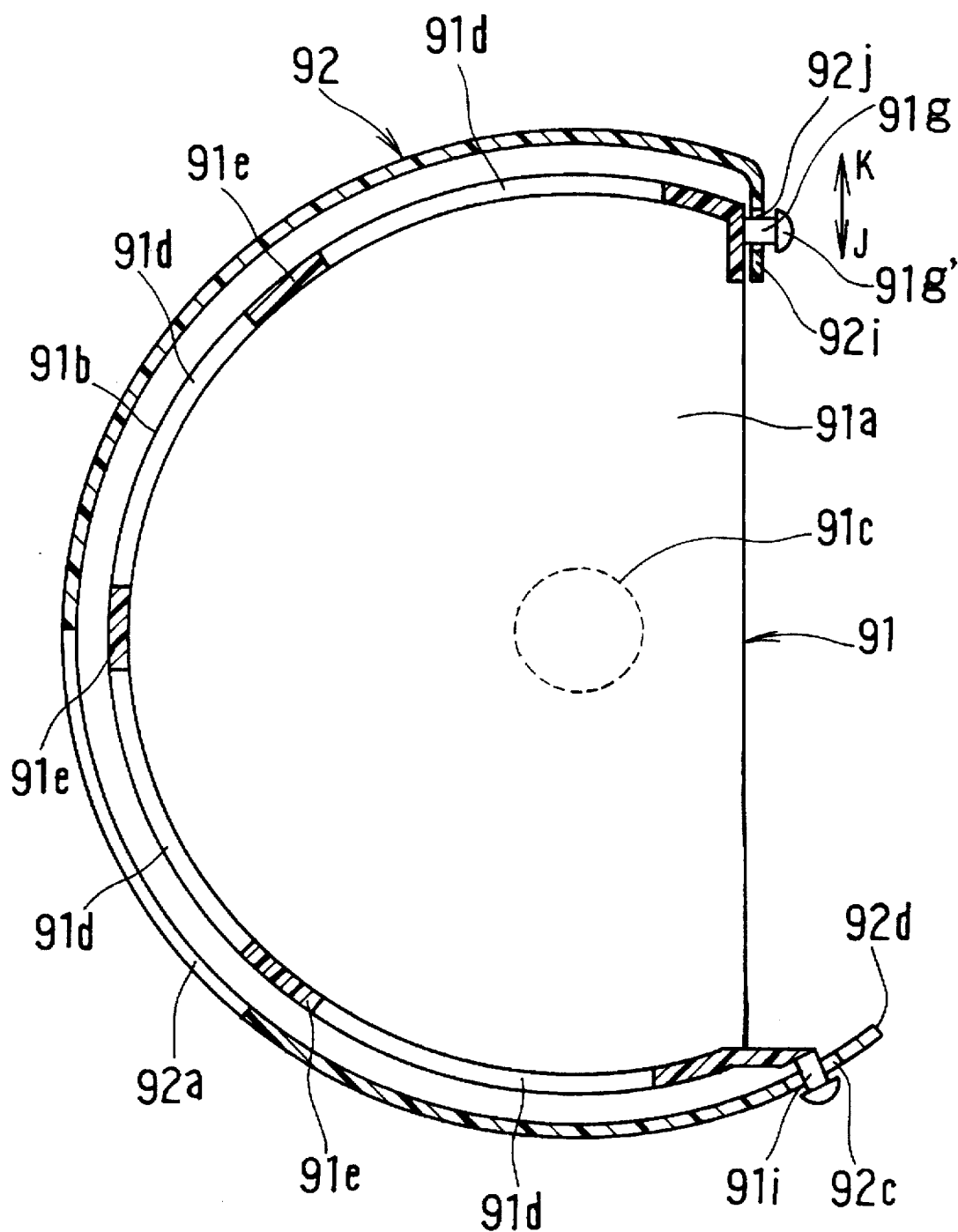
FIG. 17 is a cross sectional view of a rotary door portion showing the fourth embodiment of the present invention.
Figure 18A:
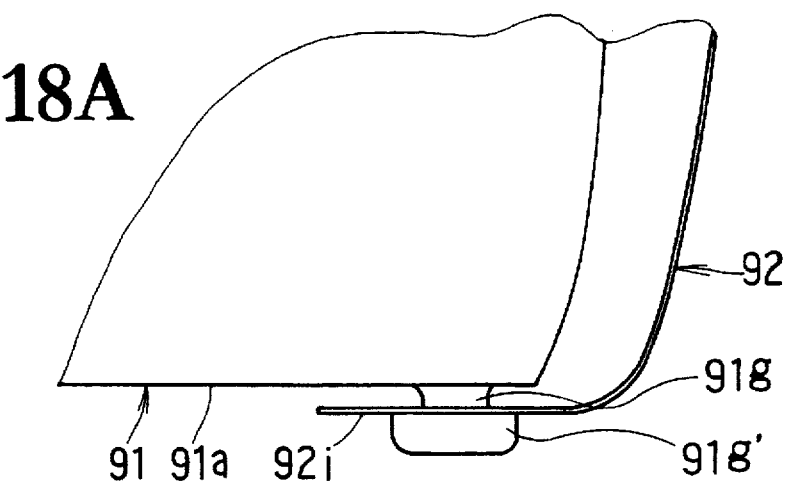
FIGS. 18A and 18B are enlarged views of main portions of a rotary door portion showing the fourth embodiment of the present invention.
Figure 18B:
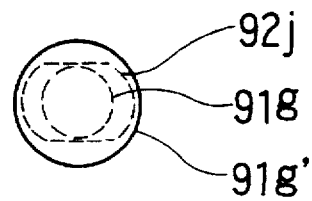

As shown in the enlarged views of FIGS. 17 and 18, as a hole provided in a radially inwardly bent portion 92i on one end side of the film member 92, there is provided not a circular hole but a slide hole 92j in the shape of a slot with respect to the radial direction of the circular shape of the film member 92. The slot-like slide hole 92j is movably fitted in a pin member 91g of the rotary door 91. An axis portion of the pin member 91g is movably fitted in the slot-like slide hole 92j, and a width of its head portion 91g' is set to be sufficiently larger than that of the slide hole 92j to prevent the film member 92 from being slipped out.

With the above-described construction, according to the fourth embodiment, a bent portion 92i on one end side of the film member 92 can be made to be a free end which is movable by a longitudinal dimension of the slide hole 92j with respect to the rotary door 91.

Figure 19:
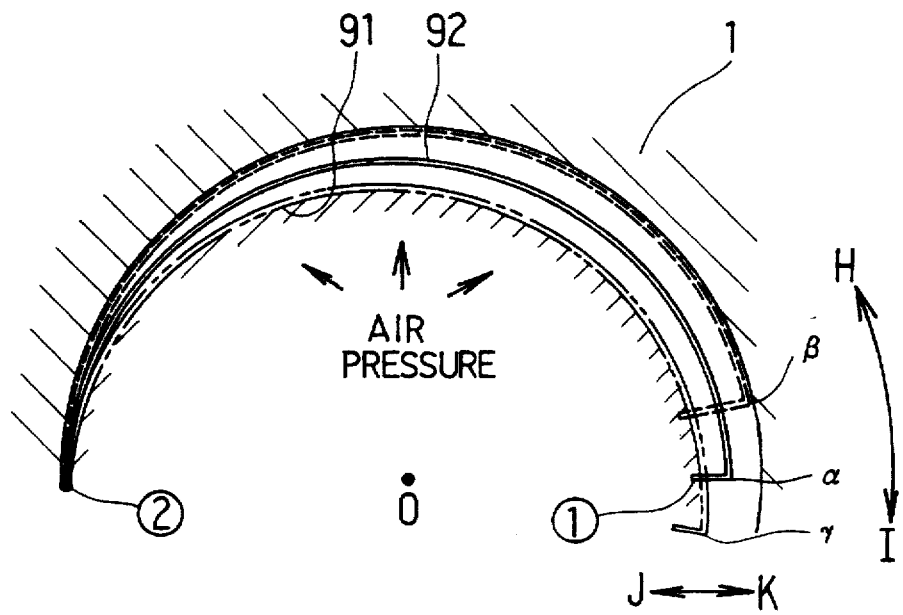
FIG. 19 is an explanatory view of an operation in the fourth embodiment of the present invention.

Accordingly, in FIG. 19, when the rotary door 91 rotates in the counterclockwise direction H so that one end side ① of the film member 92 is going to rotate in the counterclockwise direction H from position α, if the other end side ② of the film member 92 is delayed to move, a slack portion may be caused at one end side ② of the film member 92. However, since one end side ① of the film member 92 is a free end which is movable with respect to the pin member 91g of the rotary door 91 due to the presence of the slot-like slide hole 92j, one end side ① of the film member 92 moves radially inwardly (indicated by an arrow J) due to the frictional force between the film member 92 and the case 1 so that the outer peripheral circular surface of the film member 92 maintains the shape along the inner wall of the case 1.

The slack occurs in the outer peripheral circular surface of the film member 92 so that the frictional force between the film member 92 and the inner wall of the case 1 may be suppressed. It is therefore possible to suppress the increase in the operating force when the rotary door 91 rotates in the counterclockwise direction.

In FIG. 19, conversely, when the rotary door 91 rotates in the clockwise direction I so that one end side ① of the film member 92 is going to rotate in the clockwise direction I from position α, if the other end side ② of the film member 92 moves late, tension acts on one end side ① of the film member 92 so that the diameter of the circular shape of the film member 92 tends to reduce. However, since one end side ① of the film member 92 is a movable free end, one end side ① of the film member 92 moves radially outwardly, and the outer peripheral circular surface of the film member 92 maintains the shape along the inner wall of the case 1. Accordingly, the operating force upon rotation of the rotary door 91 in the clockwise direction I slightly increases as compared with the case where one end side ① is a fixed end.

As described above, according to the fourth embodiment, the variation in the operating force as the switching of rotation between normal and opposite directions of the rotary door 9 can be greatly reduced.

While in the first to third embodiments, the end (bent portion 92k) opposite to the free end 92d of the film member 92 is an immovable fixed end, it is to be noted that as a mounting hole 92b provided in the bent portion 92k, there is provided not a circular hole but a slot-like slide hole 92j as in the fourth embodiment, and the bent portion 92k of the film member 92 may be a free end which is movable in a circumferential direction similarly to the fourth embodiment.

While in the above-described first to fourth embodiments, the rotary door 91 is formed in a half cylindrical shape having the peripheral wall 91b, it is to be noted that, since the film member 92 is disposed on the outer peripheral surface of the rotary door 91 with a clearance therebetween, the rotary door 91 may not be a half cylindrical shape. For example, the rotary door 91 may be an oval half cylindrical shape, and the film member 92 may be circular along the inner wall surface on the side of the case 1. In this way, the same effect can be also obtained.

In the second embodiment, the shape of the spring mechanism portion 92e is not limited to V-shape but other bend shapes can be employed. Further, a spring member independent on the film member 92 may be combined with the spring mechanism portion 92e to enhance the impact force of the spring mechanism portion 92e.

Further, in the first to fourth embodiments, the film member 92 is disposed on the outer peripheral surface of the circumferential wall 91b of the rotary door 91, however, an axially extending elongated elastic member such as urethane foam may be disposed between a beam 91e of the peripheral wall 91b of the rotary door 91 to well keep the circular shape of the film member 92, thereby enhancing the seal performance by the film member 92 and reducing the noise.

In the first to fourth embodiments, the film opening portions 92a are constituted by plural opening portions, however, these are not limited to plural but a single opening portion may be employed.

Further, with respect to the actuating structure the rotary door 91, it is not limited to one in which the control cable 22 is directly driven by the blow mode switching lever manually operated, but for example, the rotary door 91 may be rotatively displaced by a separate actuating source such as a motor driven by an electrical switch and its operation.

The present invention is not limited to the automotive air conditioner described in the above embodiments, but can be applied to various apparatuses for opening or closing an air passage, and can be suitably modified and embodied within a scope not departing from the subject matter.

What is claimed is:

1. An air passage switching device comprising:
    a case for forming an air passage having an air passage opening portion;
    a rotary door rotatably disposed within said case and having a circular circumferential wall to which a door vent opening is opened; and
    a film member disposed on an outer peripheral side of said circumference wall of said rotary door, said film member having a flexibility for being rotated with said rotary door, said film member having a film opening portion which always communicates with said door vent opening; wherein,
    said rotary door is rotated so as to selectively communicate or interrupt between said film opening portion and said air passage opening portion,
    at least one end of both ends in a peripheral direction of said film member is a free end movable in a peripheral direction against said rotary door.

2. An air passage switching device according to claim 1, wherein said air passage opening portion includes plural air passage opening portions opened in the peripheral direction of said rotary door in said case, and said free end of said film member is always provided at an end portion on a side positioned outside an opening range of said plural air passage opening portions.

3. An air passage switching device according to claim 1, wherein,
    a slide hole having an elongated shape relative to the peripheral direction is provided on said free end in the peripheral direction of said film member,
    said rotary door is provided with a pin member for movably fitting in said slide hole, said film member is provided with a stopping hole in communication with a longitudinal end of said slide hole, and said pin member is fittingly stopped in said stopping hole to reduce a circular diameter of said film member, under which condition, said free end is stopped against said rotary door.

4. An air passage switching device according to claim 3, further comprising:

a stopper provided at a position in a manner as to contact with said free end by rotation of said rotary door within said case, wherein, said film member moves from a stopping state between said pin member and said stop hole to a movable fitting state between said pin member and said slide hole by a contact between said stopper piece and said free end.

5. An air passage switching device according to claim 1, wherein the other end in the peripheral direction of said film member is a free end movable in a radial direction of said film member against said rotary door.

6. An air passage switching device according to claim 1, wherein the other end in the peripheral direction of said film member is a immovable fixed end against said rotary door.

7. An air passage switching device comprising:

a case for forming an air passage having an air passage opening portion;

a rotary door rotatably disposed within said case and having a circular circumferential wall to which a door vent opening is opened; and a film member disposed on an outer peripheral side of said circumference wall of said rotary door, said film member having a flexibility for being rotated with said rotary door, said film member having a film opening portion which always communicates with said door vent opening; wherein, said rotary door is rotated so as to selectively communicate or interrupt between said film opening portion and said air passage opening portion, at least one end of both ends in a peripheral direction of said film member is formed with a spring mechanism portion formed of a bent shape of said film member, and an impact force for pressing said film member against a peripheral portion of said air passage opening portions is generated by said spring mechanism portion.

8. An air passage switching device according to claim 7, wherein the spring mechanism portion is formed at one end in the peripheral direction of the film member, and the rotary door is secured to the other end in the peripheral direction of said film member.

9. An air passage switching device according to claim 7, wherein said plural air passage opening portions are opened in the peripheral direction of said rotary door in said case, and said spring mechanism portion of said film member is always provided at an end portion on a side positioned outside an opening range of said plural air passage opening portions.

10. An air passage switching device according to claim 1, wherein said film member has a rigidity of a flexible value being equal to 240 g or more.

11. An automotive air conditioning apparatus for introducing conditioned air into a passenger compartment, said air conditioning apparatus comprising:

a case for forming an air passage having air passage opening portions including an air passage opening portion for face, an air passage opening portion for foot and an air passage opening portion for defroster;

a rotary door rotatably disposed within said case and having a circular circumferential wall to which a door vent opening is opened; and a film member disposed on an outer peripheral side of said circumference wall of said rotary door, said film member having a flexibility for being rotated with said rotary door, said film member having a film opening portion which always communicates with said door vent opening; wherein, said rotary door is rotated so as to selectively communicate or interrupt between said film opening portion and said air passage opening portion, at least one end of both ends in a peripheral direction of said film member is a free end movable in a peripheral direction against said rotary door.

12. An automotive air conditioning apparatus for introducing conditioned air into a passenger compartment, said air conditioning apparatus comprising:

a case for forming an air passage having air passage opening portions including an air passage opening portion for face, an air passage opening portion for foot and an air passage opening portion for defroster;

a rotary door rotatably disposed within said case and having a circular circumferential wall to which a door vent opening is opened; and a film member disposed on an outer peripheral side of said circumference wall of said rotary door, said film member having a flexibility for being rotated with said rotary door, said film member having a film opening portion which always communicates with said door vent opening; wherein, said rotary door is rotated so as to selectively communicate or interrupt between said film opening portion and said air passage opening portion, at least one end of both ends in a peripheral direction of said film member is a free end movable in a peripheral direction against said rotary door.

* * * * *